(12) United States Patent
Foerster et al.

(10) Patent No.: US 8,333,818 B2
(45) Date of Patent: Dec. 18, 2012

(54) FILTER ELEMENT AND COMPRESSED AIR FILTER FOR SEPARATING FOREIGN MATTER FROM A COMPRESSED AIR STREAM

(75) Inventors: Andreas Foerster, Doerfles-Esbach (DE); Norbert Fischer, Meeder (DE); Michael Feisthauer, Meeder (DE)

(73) Assignee: Kaeser Kompressoren GmbH, Coburg (DE)

( * ) Notice: Subject to any disclaimer, the term of this patent is extended or adjusted under 35 U.S.C. 154(b) by 0 days.

(21) Appl. No.: 13/155,895

(22) Filed: Jun. 8, 2011

(65) Prior Publication Data

US 2011/0296999 A1    Dec. 8, 2011

Related U.S. Application Data

(63) Continuation of application No. PCT/EP2009/067529, filed on Dec. 18, 2009.

(30) Foreign Application Priority Data

Dec. 18, 2008  (DE) .......................... 10 2008 054 878

(51) Int. Cl.
*B01D 46/00*  (2006.01)
(52) U.S. Cl. ................ 55/502; 55/498; 55/503; 55/510; 55/DIG. 17; 210/443; 210/450
(58) Field of Classification Search ............... 55/498, 55/502, 503, 510, DIG. 17; 210/440, 443, 210/444, 445, 450
See application file for complete search history.

(56) References Cited

U.S. PATENT DOCUMENTS

| 4,668,256 A | 5/1987 | Billiet |
| 4,711,717 A | 12/1987 | Wolf |
| 4,721,563 A | 1/1988 | Rosaen |

(Continued)

FOREIGN PATENT DOCUMENTS

DE    3125001 A1    1/1983

(Continued)

OTHER PUBLICATIONS

German Office Action for German Application No. 10 2008 054 878.2-23 dated Dec. 2, 2009.

(Continued)

*Primary Examiner* — Robert Clemente
(74) *Attorney, Agent, or Firm* — Jenkins, Wilson, Taylor & Hunt, P.A.

(57) ABSTRACT

A compressed air filter and a filter element which is for separating foreign bodies from a compressed air stream and which has an element lower portion, an element upper portion which has a neck portion which forms a first flow channel and a collar portion which is constructed so as to extend at least partially around the neck portion and which is connected to the neck portion so as to form a second flow channel, and a filter medium which is sealingly connected to the element lower portion and the element upper portion in order to form a gas flow path between the first flow channel and the second flow channel through the filter medium, the collar portion having an abutment face, which is provided at least partially at the outer periphery and which tapers in the direction of the element lower portion, in order to receive an associated sealing ring in such a manner that a force which acts substantially axially on the sealing ring from the direction of the element lower portion brings about radial expansion of the sealing ring along the abutment face.

65 Claims, 14 Drawing Sheets

U.S. PATENT DOCUMENTS

| | | | |
|---|---|---|---|
| 6,571,962 B2 * | 6/2003 | Thomas | 210/457 |
| 6,936,084 B2 | 8/2005 | Schlensker et al. | |
| 8,162,151 B2 * | 4/2012 | Pauwels et al. | 210/437 |
| 2009/0127198 A1 * | 5/2009 | Salvador et al. | 210/650 |
| 2010/0000412 A1 | 1/2010 | Heikamp | |

FOREIGN PATENT DOCUMENTS

| | | | |
|---|---|---|---|
| DE | 3541370 A1 | 5/1986 |
| DE | 3520139 A1 | 12/1986 |
| DE | 10309428 B4 | 9/2004 |
| DE | 202007011389 U1 | 10/2007 |
| DE | 202006019003 U1 | 5/2008 |
| EP | 1343574 A1 | 9/2003 |

OTHER PUBLICATIONS

International Search Report for PCT Application No. PCT/EP2009/067529 dated Mar. 29, 2010.

International Search Report for German Application No. DE 102008054878 A1 dated Jul. 8, 2010.

* cited by examiner

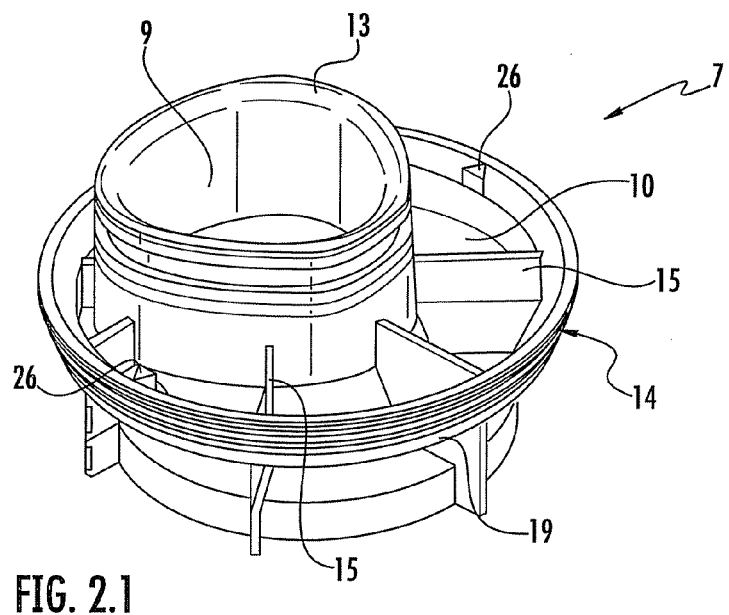
FIG. 2.1
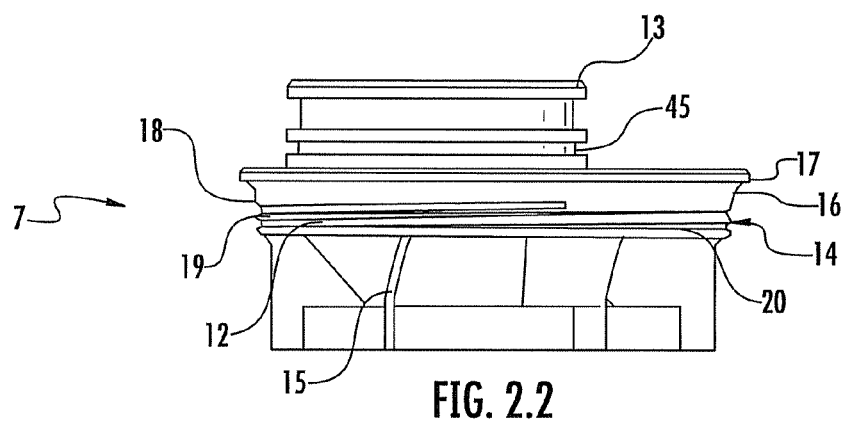
FIG. 2.2

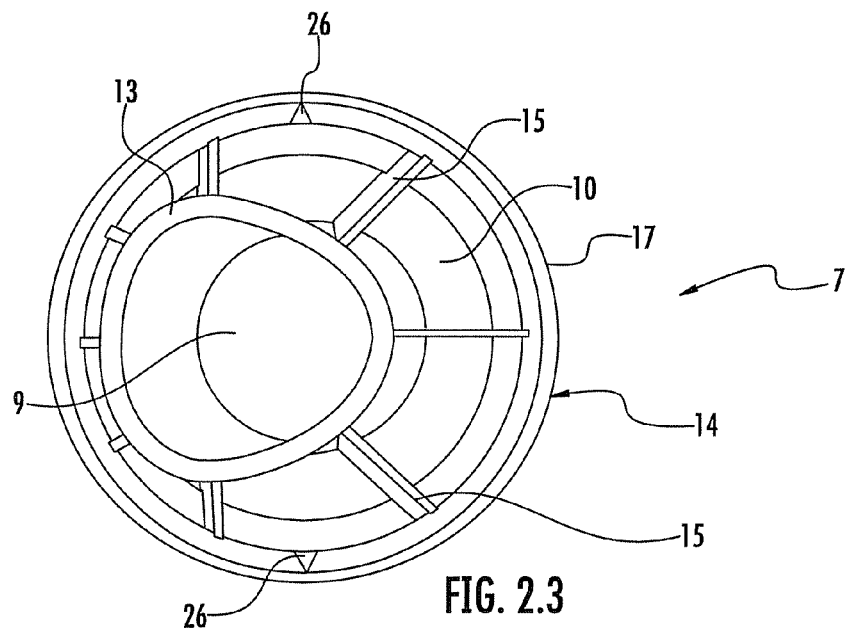
FIG. 2.3
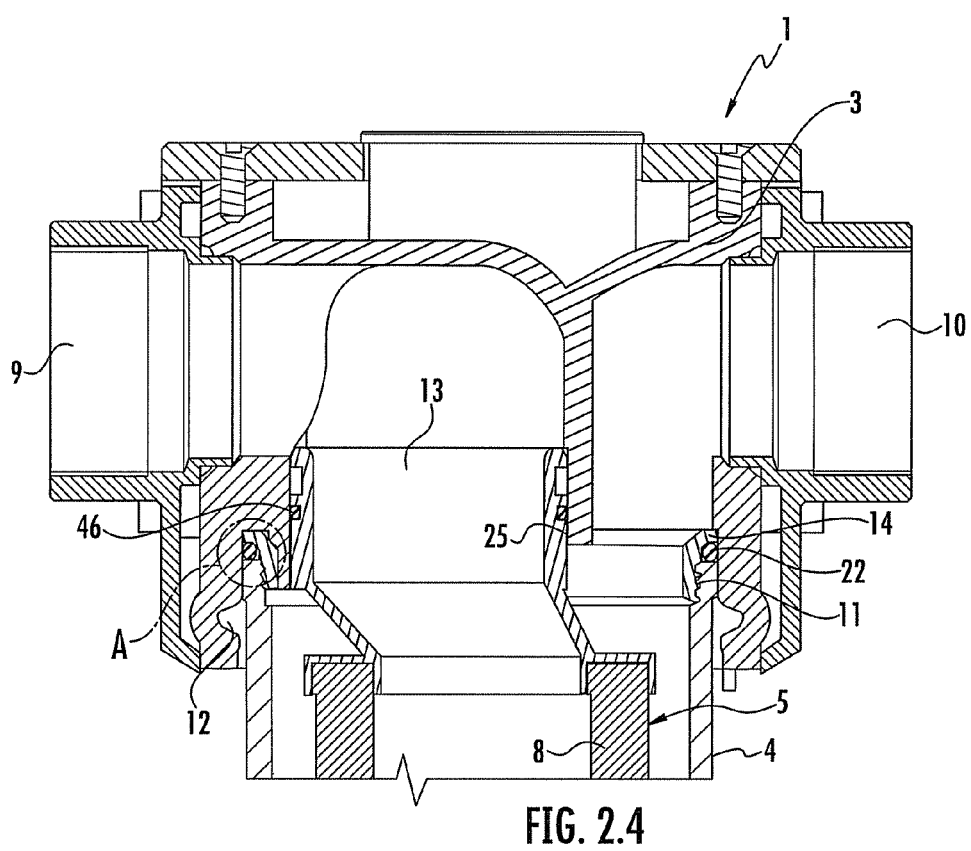
FIG. 2.4

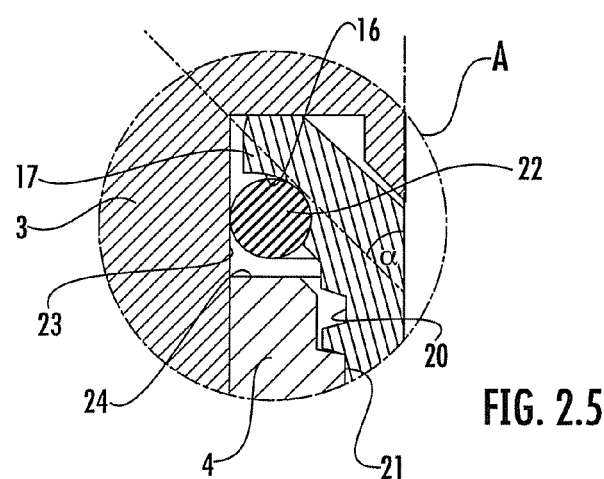
FIG. 2.5
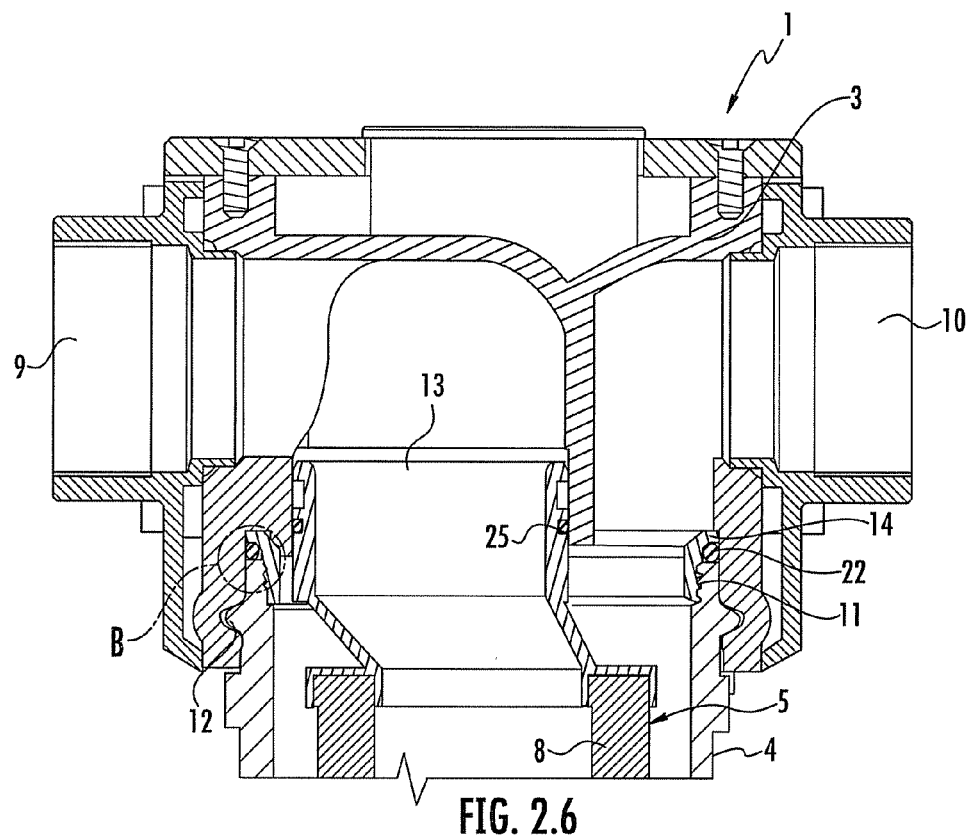
FIG. 2.6

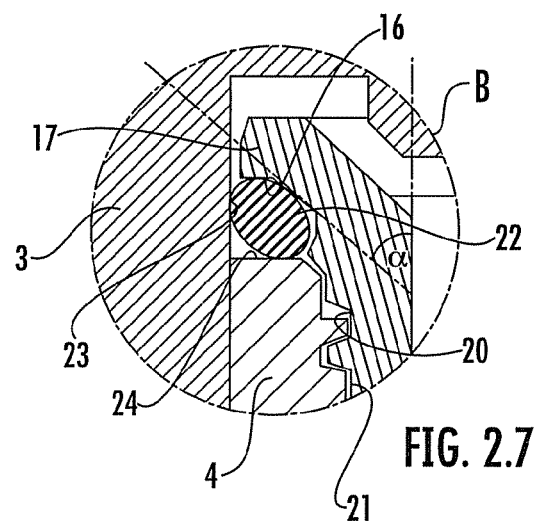
FIG. 2.7
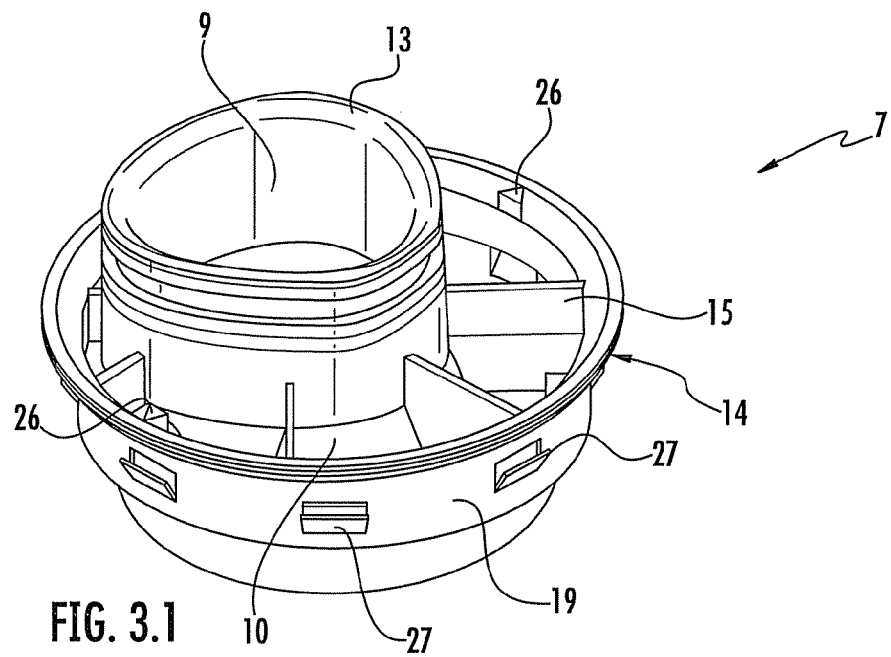
FIG. 3.1

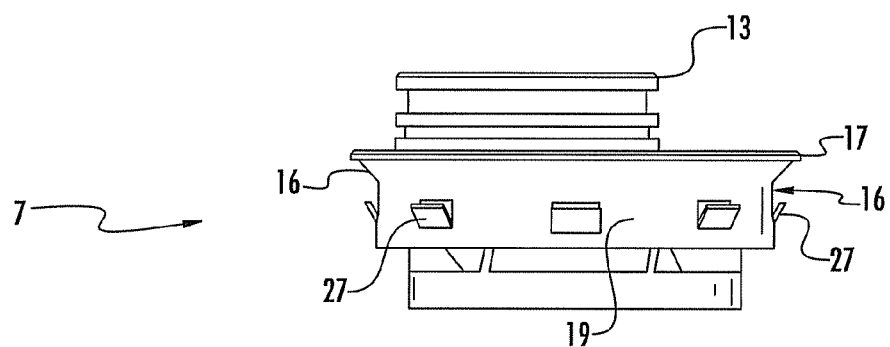
FIG. 3.2
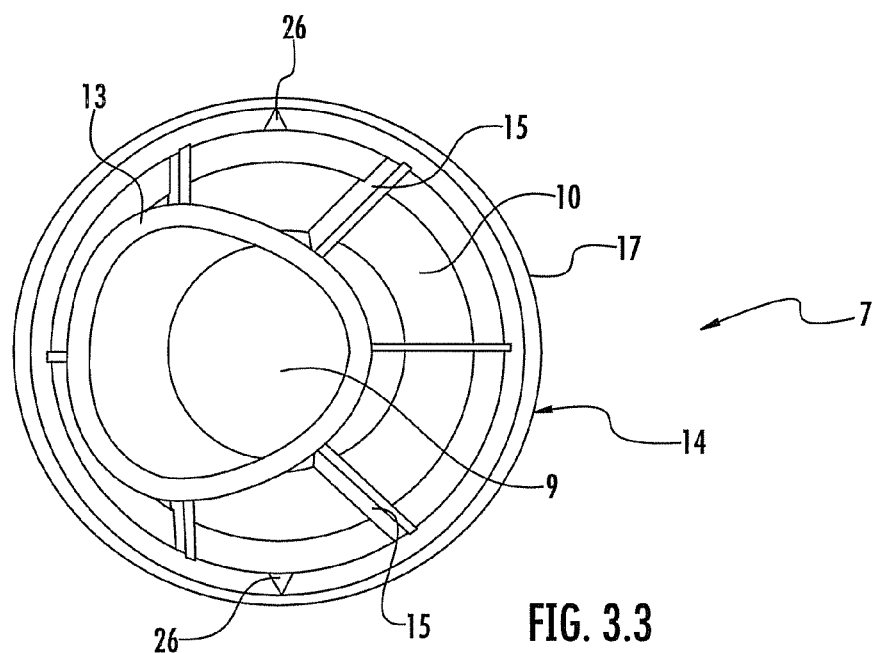
FIG. 3.3

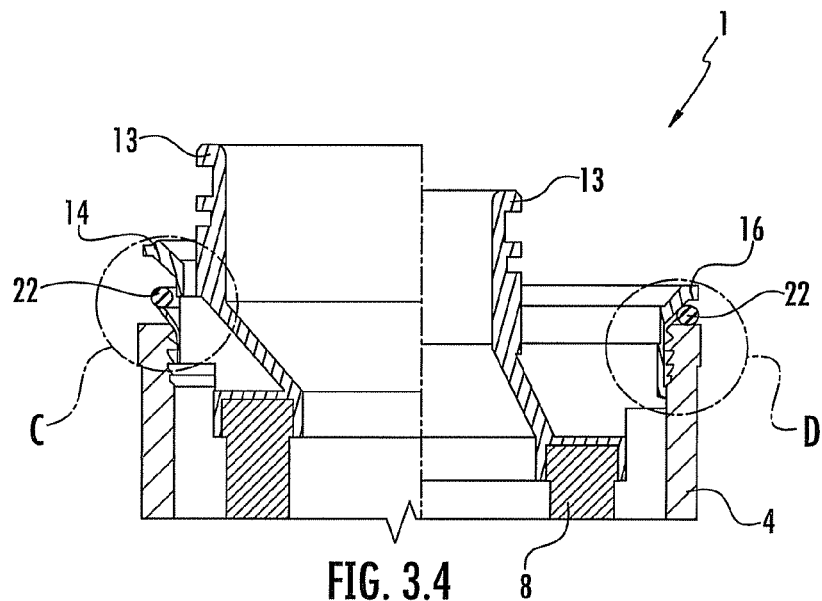
FIG. 3.4
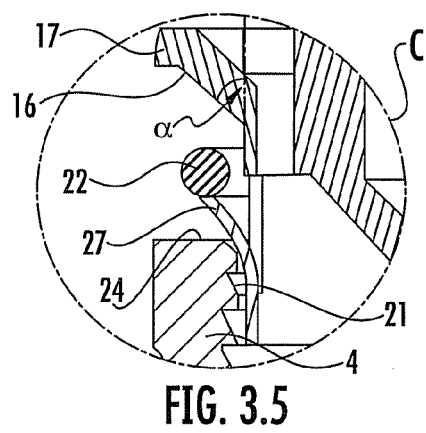
FIG. 3.5

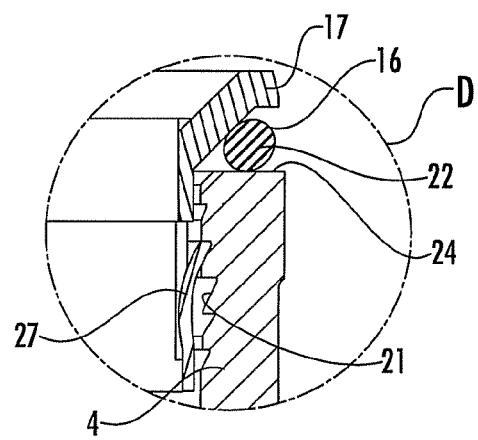
FIG. 3.6
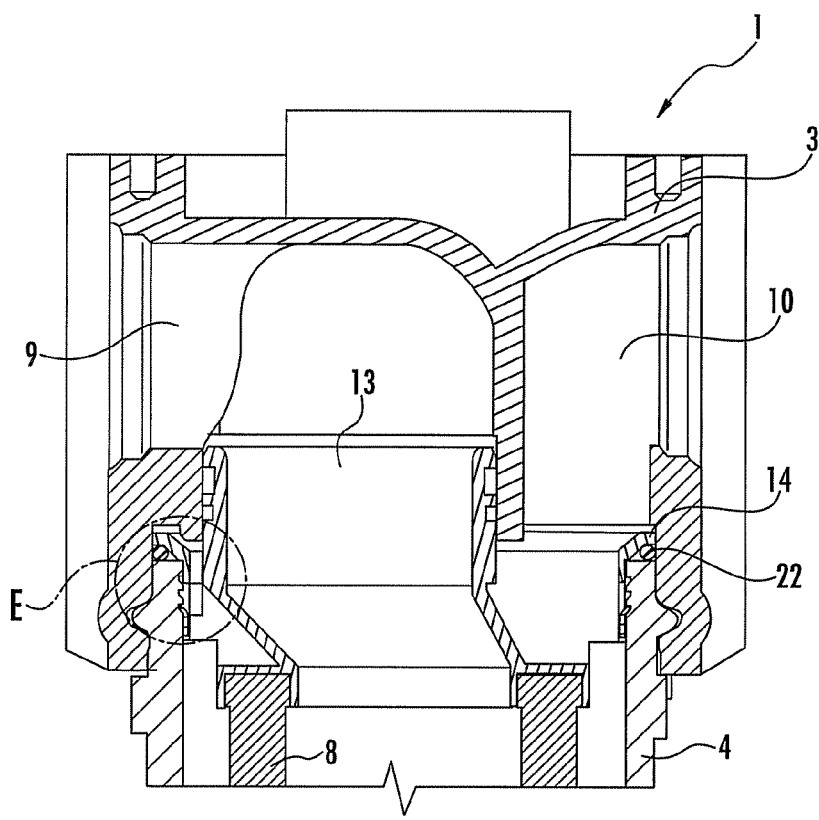
FIG. 3.7

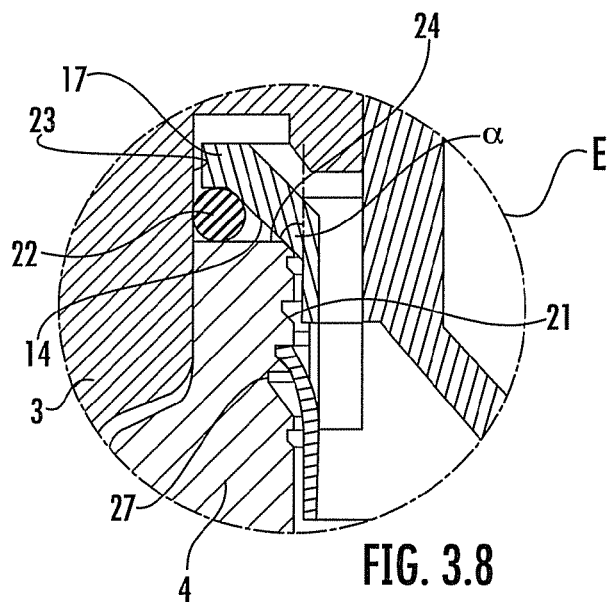
FIG. 3.8
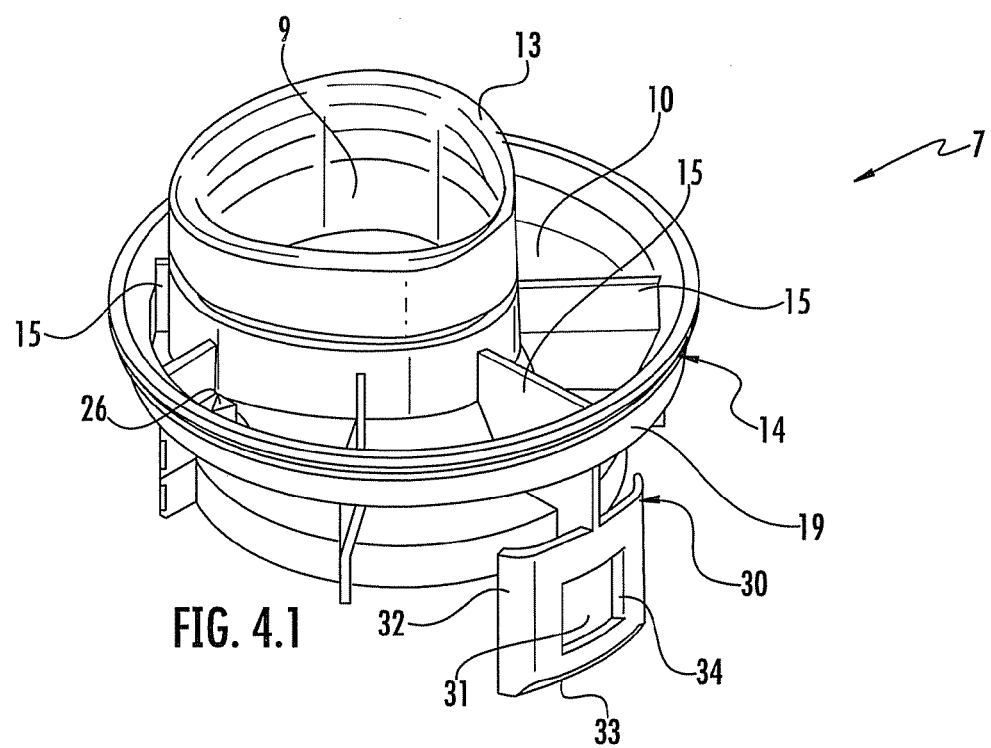
FIG. 4.1

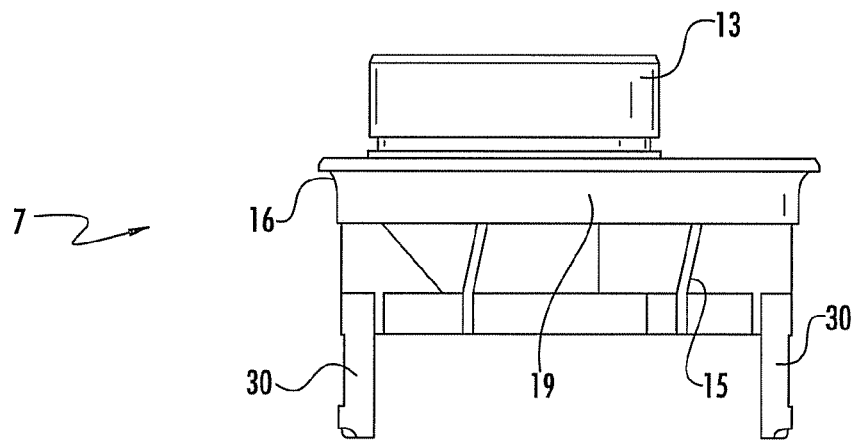
FIG. 4.2
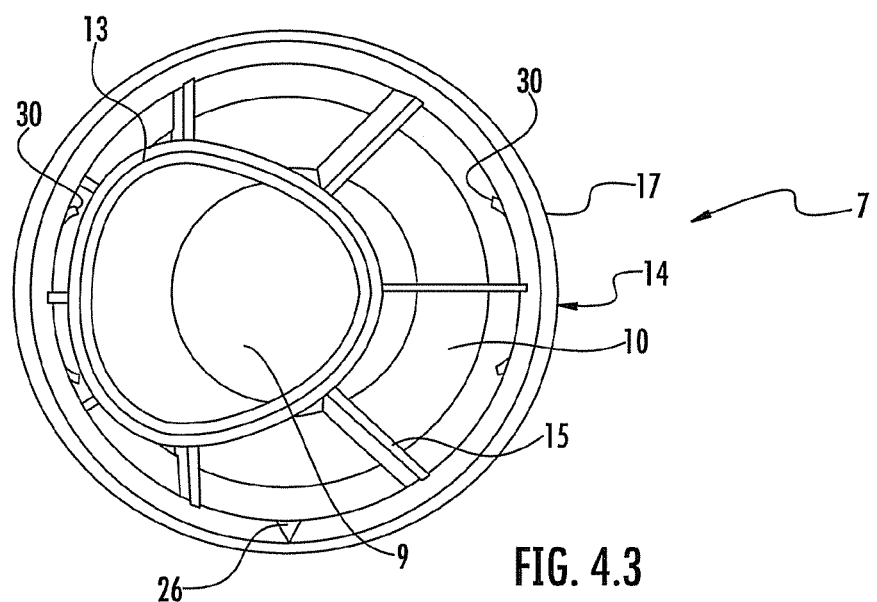
FIG. 4.3

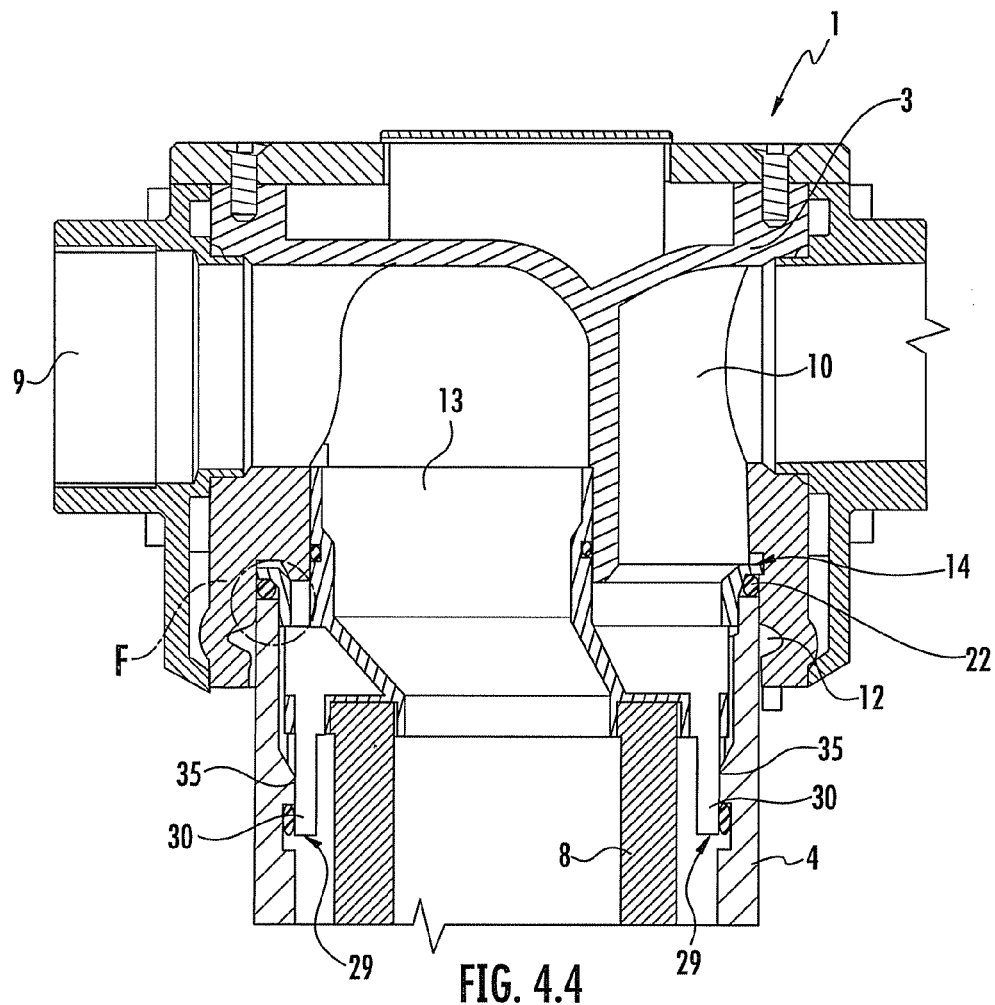
FIG. 4.4
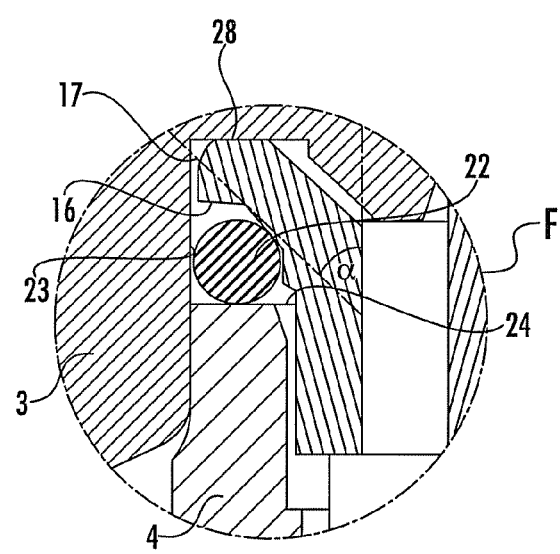
FIG. 4.5

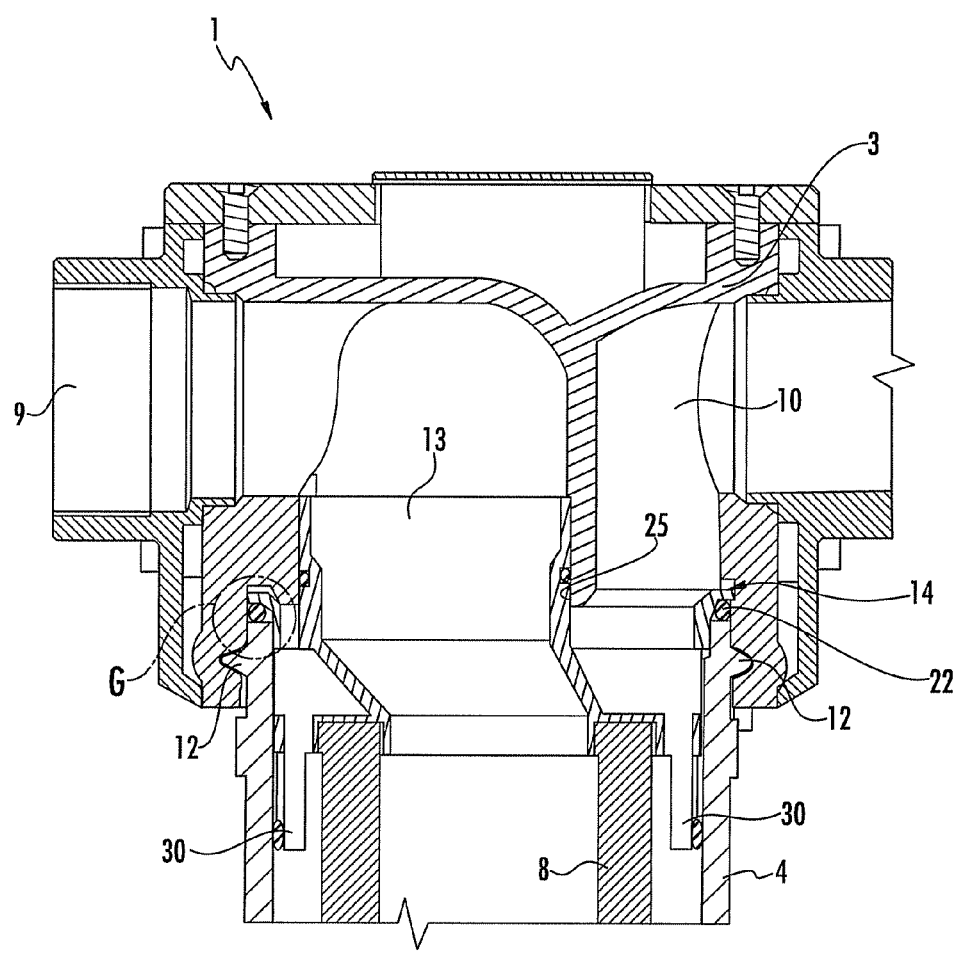
FIG. 4.6

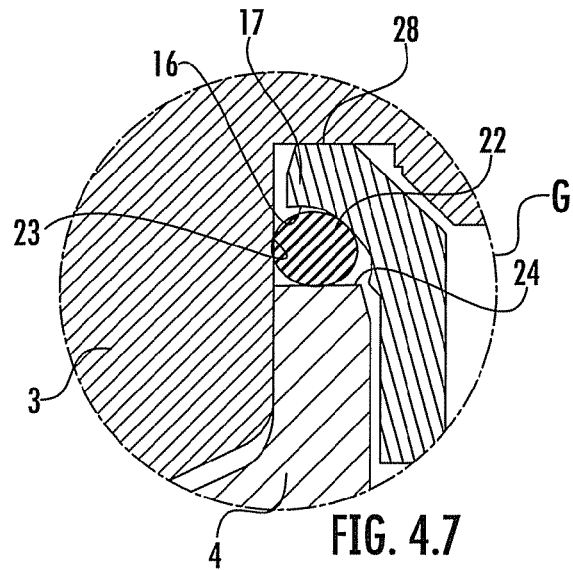
FIG. 4.7
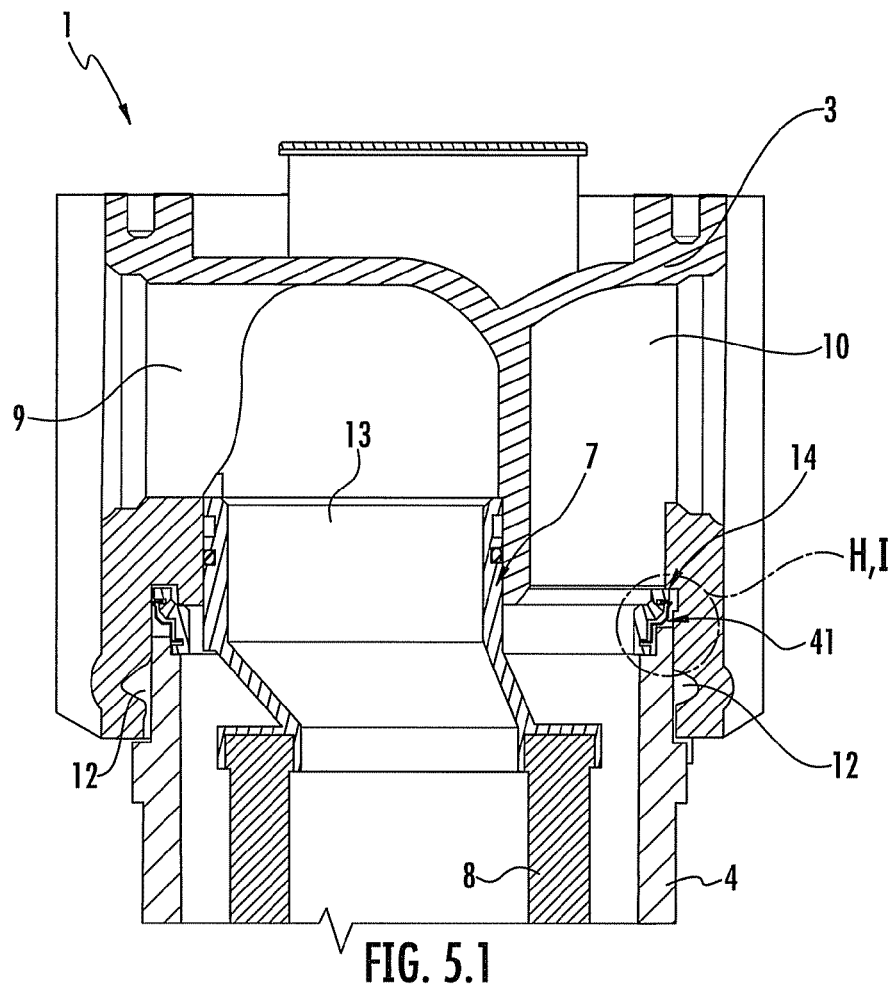
FIG. 5.1

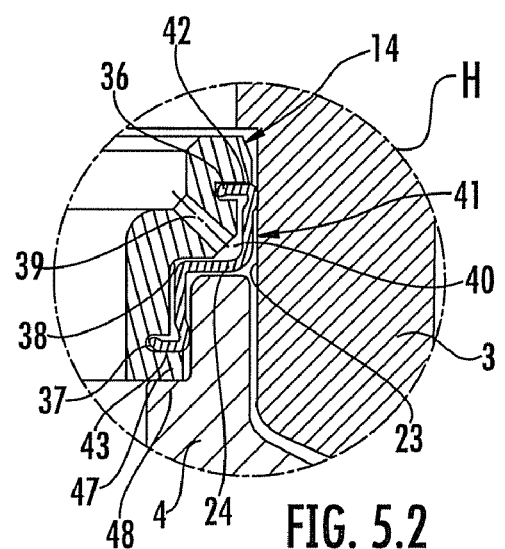
FIG. 5.2
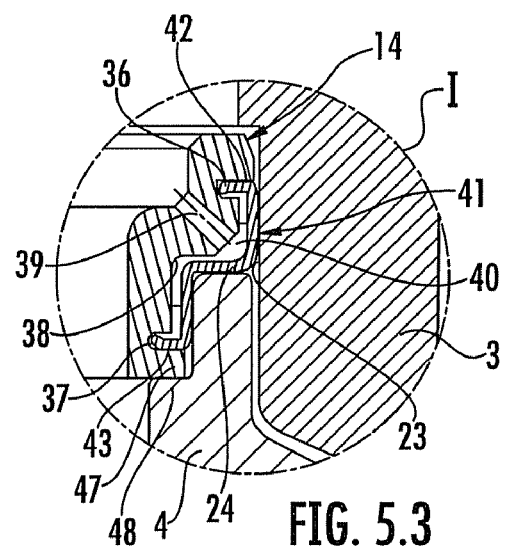
FIG. 5.3

FILTER ELEMENT AND COMPRESSED AIR FILTER FOR SEPARATING FOREIGN MATTER FROM A COMPRESSED AIR STREAM

CROSS-REFERENCE TO RELATED APPLICATIONS

This application is a continuation of PCT/EP2009/067529 filed Dec. 18, 2009 and claims the benefit of and priority to German Patent Application No. 10 2008 054 878.2, filed Dec. 18, 2008, the entire disclosure of which is herein incorporated by reference.

FIELD OF THE INVENTION

The present invention relates to a filter element and a compressed air filter for separating foreign bodies from a compressed air stream.

Although the present invention can be used in any filter systems, the present invention and the problem addressed by it are explained in greater detail in relation to a compressed air filter. However, the notion of the present invention can also be used, for example, in a fluid separator or the like.

Conventional compressed air filters generally comprise a two-piece housing having a housing upper portion and a housing cap which are either screwed together or connected to each other by means of a cap nut or bayonet-type closure. The housing upper portion generally has an intake channel and a discharge channel at diametrically opposed sides. The intake channel opens either centrally into a hollow-cylindrical replaceable filter element, which is introduced or screwed into the housing upper portion in a sealing manner, or into the annular space between the filter element and the filter housing. Accordingly, the discharge channel extends either from the annular space or from the interior of the filter element depending on whether the filter element is to be subjected to flow in an outward direction or in an inward direction. Therefore, the direction of flow in the filter is generally fixed after fitting and cannot be changed in the fitted position. The field of application of the filter is also generally fixed at the same time as the direction of flow. When dust is filtered, the filter element is generally subjected to flow from the outer side and is subjected to flow from the inner side in order to separate compressed air condensate during coalescence filtration.

The filter elements are generally maintenance parts which have to be changed after a given time owing to the occurrence of contamination. The filter element generally comprises an element lower portion, an element upper portion and a filter medium which is sealingly connected, usually adhesively-bonded, to the element lower portion and the element upper portion in order to form a predetermined gas flow path through the filter medium.

In addition to a sealing connection between the element upper portion of the filter element and the housing upper portion of the filter housing, a housing seal must also be provided between the housing upper portion and the housing cap of the filter housing in order to close the filter housing after assembly in a pressure-tight manner with respect to the environment and consequently not to allow any compressed air to be discharged. That housing sealing is generally provided separately from the filter element and, according to the prior art, is usually inserted in the form of a radially acting O-ring seal in an O-ring recess in the housing upper portion or in the housing cap of the filter housing.

The publication EP 1 343 574 B1 describes a compressed air filter, in which a seal is constructed between the housing upper portion and the housing cap of the filter housing by means of a radial O-ring seal. The O-ring seal is inserted in a corresponding radial recess in the housing cap and adjoins an associated cylindrical outer face of the housing upper portion in a radially sealing manner in the closure position in order to ensure radial sealing.

When such a radial seal as described in EP 1 343 574 B1 is used, a substantial friction force or a substantial friction moment must disadvantageously be overcome at least in the final phase of the closing operation owing to the O-ring which is provided radially. It is also disadvantageous that the friction of the O-ring, which is deformed by the long-term internal pressure in the filter housing and which is pressed into the surface roughness, has to be overcome in such constructions with a radial seal during the opening operation to remove the filter element, whereby great actuation forces or torques are necessary, in particular in the case of relatively large diameters of the housing caps. Particularly at the beginning of the opening operation, substantial breakaway forces or a substantial breakaway moment must be applied which are substantially greater than the assembly force or the assembly moment. From a specific housing size, consequently, the assembly and particularly the disassembly of a filter element in or out of the filter housing generally can no longer be carried out manually, but instead only by using an additional tool in a disadvantageous manner.

Publication DE 103 09 428 B4 describes a compressed air filter, in which a plurality of housing seals are located at the front side between the housing cap and the housing upper portion of the filter housing.

In order to accommodate the seal whilst the inner diameter of the housing cap remains the same, such a construction needs a larger diameter of the housing cap and the housing upper portion in the sealing region so larger faces which are subjected to pressure and greater forces are produced in contrast to radial seals. In order to simplify assembly or to prevent damage to the seals during the assembly operation, it is disadvantageously necessary to prevent rotational movement of the sealing faces of the housing cap in relation to the sealing faces of the housing upper portion during the closure operation. Consequently, it is not possible to use a simple closure thread between the housing upper portion and the housing cap. Instead, more complex solutions have to be constructed, for example, in the form of a cap nut, with which the housing cap is drawn against the housing upper portion, as described, for example, in DE 103 09 428 B4 or DE 35 41 370.

Another problem of such axially arranged seals is constituted by the seal being fixed to the element upper portion. Axially acting O-rings cannot be readily retained on the element upper portion in a positive-locking manner. Materially engaging seals such as, for example, elastomer seals which are injection-moulded during the production process can again present problems with regard to the sealing function because, in contrast to an O-ring seal, the seal does not become applied in the sealing gap as a result of the pressure difference. Therefore, it may absolutely be the case that the assembly pretensioning decreases over time owing to occurrences of creep or settlement of the sealing material and the seal no longer functions reliably.

Disadvantageously, special seals in the form of a seal which engages in a U-like manner around the collar of the element upper portion, as described, for example, in publication U.S. Pat. No. 4,721,563, require a relatively large amount of construction space and a high level of construction complexity and may become non-tight in an undesirable manner if a defined assembly pretension cannot be maintained or if the seal is not applied to the sealing gap as a result of the pressure difference.

When the contaminated filter elements are disassembled, another disadvantage of many known filter constructions is that the filter element is not retained axially in the housing cap but instead still remains connected to the housing upper portion or is retained by the seal between the element upper portion and the housing upper portion after the housing cap has been loosened. In order to disassemble the filter element in such a case, therefore, either the housing cap generally has to be axially pulled off over the entire length of the filter element or the filter element has to be loosened by hand through the gap between the housing upper portion and the housing cap with the housing cap being partially pulled off. In the first case, the spatial requirement is disadvantageous and, in the second case, contact with the contaminated filter element is disadvantageous and handling for the user is extremely complicated because it is necessary simultaneously to hold the housing cap and to loosen the filter element.

Another disadvantage of some known filter constructions having a housing seal fitted to the element upper portion is that the filter element is supported by means of the housing seal in an axial direction with respect to the filter housing. Owing to changing media flowing through the filter element, changing pressure differences and consequently changing axial forces act on the housing seal, whereby it may become damaged and the sealing operation thereof may also be impaired. The same effect may occur owing to settlement of the seal under pressure differences or axial forces which act over a long period of time.

In the prior art, for example, in publication U.S. Pat. No. 4,721,563, an axial support for the filter element on the element lower portion is provided in order to solve that problem. However, this is disadvantageous to the operation of the housing seal owing to longitudinal tolerances of the filter element, the housing upper portion and the housing cap.

SUMMARY OF THE INVENTION

An object of the present invention is to overcome the above-mentioned disadvantages and to provide a filter element which is improved over the prior art and a compressed air filter which is improved over the prior art.

The notion forming the basis of the present invention involves providing a filter element which is for separating foreign bodies from a compressed air stream and which has an element lower portion; an element upper portion which has a neck portion which forms a first flow channel and a collar portion which is constructed so as to extend at least partially around the neck portion and which is connected to the neck portion so as to form a second flow channel; and a filter medium which is sealingly connected to the element lower portion and the element upper portion in order to form a gas flow path between the first flow channel and the second flow channel through the filter medium; the collar portion having an abutment face, which is provided at least partially at the outer periphery and which tapers in the direction of the element lower portion, in order to receive an associated sealing element in such a manner that a force which acts substantially axially on the sealing element from the direction of the element lower portion brings about radial expansion of the sealing element along the abutment face.

The present invention is further based in this regard on the notion of providing a compressed air filter which is for separating foreign bodies from a compressed air stream and which has the above-described filter element according to the invention; and a filter housing which receives the filter element in a sealing manner and which has a housing upper portion having a first sealing face, which is associated with the sealing element of the filter element and which is provided at least partially at the inner periphery, and a housing cap having a second sealing face which is associated with the sealing element of the filter element and which is provided at least partially at the front side; the housing cap being able to be connected to the housing upper portion by means of a closure movement of the filter housing in order to form a sealing closure position; and the filter element being able to be connected to the housing upper portion and the housing cap in such a manner that the closure movement of the filter housing brings about a relative movement which is directed substantially axially towards each other between the collar portion of the filter element and the housing cap, whereby the second sealing face of the housing cap radially expands the sealing element along the abutment face of the collar of the filter element into sealing abutment with the first sealing face of the housing upper portion.

Furthermore, another notion forming the basis of the present invention is to provide a filter element which is for separating foreign bodies from a compressed air stream and which has an element lower portion; an element upper portion which has a neck portion which forms a first flow channel and a collar portion which is constructed so as to extend at least partially around the neck portion and which is connected to the neck portion so as to form a second flow channel; and a filter medium which is sealingly connected to the element lower portion and the element upper portion in order to form a gas flow path between the first flow channel and the second flow channel through the filter medium; the collar portion having a sealing element receiving portion, which is provided at least partially at the outer periphery, at least one connection channel between one of the two flow channels and the sealing element receiving portion and sealing element fixing portions, which axially delimit the sealing element receiving portion, for securely and sealingly receiving peripheral portions of an associated sealing element in such a manner that an excess pressure, which is supplied by the at least one connection channel and which acts on the sealing element, brings about expansion of the sealing element in the direction towards the outer side in the region of the sealing element receiving portion.

Accordingly, another notion forming the basis of the present invention is further to provide a compressed air filter which is for separating foreign bodies from a compressed air stream and which has the above-mentioned filter element; and a filter housing which sealingly receives the filter element and which has a housing upper portion having a first sealing face, which is associated with the sealing element of the filter element and which is provided at least partially at the inner periphery, and a housing cap having a second sealing face which is associated with the sealing element of the filter element and which is provided at least partially at the front side; the filter element being able to be connected to the housing upper portion and the housing cap in such a manner that the sealing element expands in the closure position of the filter housing when an excess pressure occurs through the at least one connection channel in the region of the sealing element receiving portion into sealing abutment with the first sealing face of the housing upper portion and into sealing abutment with the second sealing face of the housing cap.

The above-mentioned inventive notions have in common that, advantageously, no relevant friction forces occur between the sealing element and the corresponding sealing faces until the definitive closure position has been reached or the compressed air filter is subjected to compressed air owing to a special construction and arrangement of the sealing element on the collar portion of the filter element and a special method for connecting the housing upper portion, the housing cap and the filter element together.

Consequently, the present invention has the advantage over known approaches in accordance with the prior art that only small assembly forces are necessary when the filter housing is opened or closed before or after the filter element is changed. The housing cap can further be inserted into the housing upper portion together with the filter element with a small assembly force because substantial friction forces between the sealing element and the abutment face with the collar portion and the sealing faces on the housing upper portion and the housing cap have to be overcome only at the end of the housing closure movement, or abutment of the sealing element against the correspondingly associated sealing faces occurs only when the compressed air filter is subjected to compressed air, whereby practically no friction forces have to be overcome.

Furthermore, the filter element can advantageously be assembled or disassembled together with the housing cap, which substantially facilitates handling. Advantageously, the spatial requirement for closing or opening the housing cap downwards if the filter element is changed is thereby further reduced.

In addition, direct hand contact by the user with the contaminated filter element is advantageously ensured by a simple locking mechanism which can readily be disengaged such as, for example, a positive-locking connection between the element upper portion and the housing cap, when the filter element is removed together with the housing cap when the filter housing is opened. Handling is further simplified because only one component, that is to say, the housing cap with the filter element fixed therein, has to be introduced. Consequently, this can be carried out with two hands which is advantageously a substantially simpler operation in the case of relatively large housing caps which are sometimes very heavy.

Furthermore, the corresponding housing seal is also automatically changed each time the filter element is changed because the housing seal is provided on the filter element, which advantageously prevents any leaks as a result of worn seals.

Owing to the above-mentioned constructions, it is also possible readily to detect the absence of a filter element, particularly acoustically and/or haptically, owing to a resultant leakage from the filter housing, which is not dangerous but is noticeable.

The present invention further provides the advantage that reliable and simple housing sealing is brought about by means of a sealing element which is reliably pressed against the housing sealing gap by the pressure difference in such a manner that the sealing cannot be impaired by occurrences of settlement of the seal.

In the above-mentioned inventive notions, it is further necessary to use only one sealing element for the seal between the housing upper portion and the housing cap, whereby the number of components necessary is advantageously reduced.

Furthermore, axial support of the filter element in the region of the element upper portion on the housing cap is ensured owing to the method of connecting the filter element to the filter cap which places reduced requirements on the longitudinal tolerances of the filter element to be complied with in relation to axial support of the filter element on the element lower portion in accordance with an above-mentioned approach according to the prior art. All the dimensions which are significant and critical to the installation are only in the element upper portion in the construction methods proposed according to the invention.

According to a preferred development, the collar portion is constructed so as to extend around the entire periphery of the neck portion and in a substantially rotationally symmetrical manner relative to the centre axis of the filter element. The abutment face of the collar portion is preferably also provided so as to extend around the entire periphery and is also constructed in a substantially rotationally symmetrical manner relative to the centre axis of the filter element. A simple and cost-effective injection-moulding method can thereby advantageously be used to produce the element upper portion.

According to another advantageous construction, the abutment face of the collar portion is in the form of a cone face whose pitch or cone angle $\alpha$ between the abutment face and the centre axis of the filter element is preferably between 25° and 65°. However, it is obvious to a person skilled in the art that other constructions of the abutment face are also possible, for example, a construction which tapers with variable pitch and/or with a pitch which differs from the above-mentioned region.

According to another preferred embodiment, the collar portion of the filter element has a delimiting rib which delimits the abutment face in the direction of the element upper portion and which is preferably constructed in a peripheral manner and also so as to be substantially rotationally symmetrical relative to the centre axis of the filter element. That construction is also advantageous in a production method using injection-moulding technology.

According to another preferred development, the sealing element is in the form of a sealing ring and can be drawn on the collar portion in a predetermined retention position with slight radial pretension. It is thereby ensured that the sealing ring is prevented from becoming lost even if the filter element is in the disassembled state.

According to another preferred development, the sealing ring has in this predetermined retention position an outer diameter which is smaller than or equal to the diameter of the inner peripheral face or first sealing face in the housing upper portion, which face the sealing ring adjoins in a sealing manner in the assembled state. During the closure movement, an occurrence of relatively large friction forces owing to possible abutment of the sealing ring with the associated sealing face of the housing upper portion is thereby advantageously prevented. The necessary assembly forces can thereby be complied with advantageously for the user.

According to another preferred embodiment, the sealing ring is in the form of an O-ring with a substantially circular cross-section. Consequently, cost-effective standard components or standard O-rings can be used as the sealing ring.

According to another preferred development, the abutment face of the collar portion is constructed so as to be resiliently deformable or resilient in order to maintain permanent, resilient pretensioning of the sealing ring. To that end, the cone face or the abutment face of the collar portion can be divided, for example, radially into individual resilient segments. Permanently resilient pretensioning of the sealing ring is thereby ensured so that any reduction in the pretensioning force of the sealing ring owing to age can be compensated for.

According to another preferred development, the collar portion of the filter element is securely connected to the neck portion by means of a plurality of ribs, the plurality of ribs preferably being constructed in an optimised manner in technical flow terms. Those ribs ensure a secure connection of the collar portion with respect to the neck portion of the filter element so as to form the second flow channel which extends between the neck portion and the collar portion and through which the individual ribs extend.

According to another preferred embodiment, the neck portion of the filter element is constructed so as to have a cross-section which is different from the circular shape and/or has an eccentric position relative to the centre axis of the filter element. Accordingly, the housing upper portion advantageously has a receiving contour which is adapted to the shape of the neck portion in order to form rotation prevention means for the filter element relative to the housing upper portion in the closure position. When the housing cap is rotated relative to the housing upper portion during the closure movement of the filter housing, a relative rotational movement is thereby also brought about between the housing cap and the filter element. It is obvious to a person skilled in the art that it is also possible to have a desired rotation prevention means particularly owing to the cross-section of the neck portion being constructed so as to be different from the circular shape and being arranged so as to be central at the same time.

According to another preferred development, the element upper portion, the housing cap and/or the housing upper portion has/have at least one optical, acoustic and/or haptic angular position indication device. The times at which the correspondingly necessary relative positions between the housing cap and filter element or housing cap and housing upper portion are reached are thereby readily indicated to the user. For example, the collar portion has at least one optical marking and/or an engagement device as a haptic angular position indication device. However, it is obvious to a person skilled in the art that any type of indication device is possible which indicates to the user predetermined angular positions of the individual components relative to each other, in particular a highly perceptible, predetermined angular position.

The housing cap can be connected, for example, to the housing upper portion by means of a thread-type and/or bayonet-type connection, for example, by means of a bayonet-type connection without any pitch, or the like. A relative rotation is thereby produced between the housing cap and the filter element during the closure movement and brings about relative movement between the collar portion of the filter element and the housing cap in a direction axially towards each other owing to the provision of threaded engagement of those two components.

According to a preferred construction, the element upper portion comprises a cylindrical guide portion which faces the element lower portion and which has an outer thread which has a predetermined pitch. The housing cap preferably comprises an inner thread which corresponds to the outer thread of the element upper portion for threaded engagement in order to introduce the filter element into the housing cap or to disengage the filter element from the housing cap.

According to an alternative embodiment, the element upper portion has a cylindrical guide portion which faces the element lower portion and which has a plurality of resiliently deformable resilient tongues whose free ends are arranged in an axial direction so as to face the neck portion and at a different axial level, and whose radial extents and constructions allow the sealing element to be supported in a predetermined retention position. In this instance, the housing cap preferably has an inner thread which corresponds to the resiliently deformable resilient tongues of the element upper portion. That inner thread of the housing cap is preferably constructed as a saw-tooth-like profile. For example, the inner thread of the housing cap extends axially in the direction of the second sealing face of the housing cap. Consequently, it is advantageously possible to provide a wide sealing face of the housing cap at the front side with a given wall thickness for the housing cap and to ensure that unscrewing the filter element from the housing cap requires the smallest possible number of rotations.

In another alternative embodiment, the collar portion has an axial stop portion for an axial stop against an associated stop face of the housing upper portion of the filter housing. In this instance, the housing cap can preferably be connected to the housing upper portion by means of a bayonet-type connection with predetermined pitch. According to that embodiment, the filter element can preferably be connected to the housing upper portion and the housing cap in such a manner that the closure movement of the filter housing urges the axial stop portion of the collar portion of the filter element into abutment with the associated stop face of the housing upper portion for relative movement between the collar portion of the filter element and the housing cap in a direction substantially axially towards each other.

According to another preferred construction, there is further provided between the filter element and the housing cap a corresponding stop for an axial support of the filter element against movements in the direction of the housing cap, preferably in the form of a corresponding shoulder on the filter element and/or the housing cap. In that manner, although the sealing ring can be pretensioned accordingly, on the one hand, by the filter element being urged axially into the housing cap, it advantageously cannot be completely deformed because the sealing ring is not in the main force path between the housing cap and the filter element.

According to another preferred development, the collar portion of the filter element has at least one engagement device and the housing cap on the inner wall has at least one associated, corresponding counter-engagement device for engaging connection with the at least one engagement device of the collar portion so that the filter element is advantageously retained in the housing cap by that engaging connection during disassembly of the housing cap from the housing upper portion. For example, the at least one engagement device of the collar portion has a plurality of circumferentially distributed catches which are in the form of projections of the collar portion in the direction of the element lower portion and which each have a receiving region for an engaging receiving member of the associated counter-engagement device of the housing cap, which projections are resilient in a radial direction. The counter-engagement device of the housing cap is, for example, in the form of a plurality of engaging projections which are provided on the inner wall of the housing cap in such a manner that they can be moved into engagement with the associated catches when the bayonet-type connection is in the open position. The catches of the engagement device of the collar portion of the filter element each have at least one predetermined outer edge which is chamfered accordingly in order to provide a relatively flat sliding ramp. In that regard, at least one lateral edge of the receiving regions of the catches is chamfered accordingly in order to provide a relatively steep sliding ramp when viewed relative to the sliding ramps of the lateral outer edges of the catches. Owing to those relatively flat chamfers at the outer lateral edges of the catches relative to steeper chamfers of the lateral edges of the catch receiving regions, it is possible for the force application with which the catches are moved into engagement with the engaging projections to be smaller than the force application with which the catches are separated from the engaging projections again. It is thereby advantageously possible to ensure a highly perceptible preferred angular position of the filter element in the housing cap in the engagement position.

The catches are preferably constructed in such a manner that they take up a radially non-deformed state during the engaging connection with the associated counter-engagement device and during the rest position, in which the catches are out of engagement with the associated engagement device. Since the element upper portion and the catches are advantageously produced as an integral injection-moulded component of plastics material which consequently shows occurrences of creep under extreme deformations or pretensions. Consequently, the flexible resilience of such plastics catches which are pretensioned for a long time in an assembled state of a filter housing or are permanently deformed would be at risk owing to the plastics material having occurrences of creep. Owing to the above-mentioned construction, it may advantageously be ensured that such permanent pretensioning or deformation is avoided.

According to a preferred development, the sealing element is in the form of a sealing ring and particularly a peripheral, annular, specially shaped seal which can be introduced with slight radial pretension into a correspondingly peripheral recess in the collar portion of the element upper portion. To that end, the collar portion preferably has two sealing ring fixing portions which are each in the form of a receiving channel which extends around the collar portion in order to securely receive the peripheral portions of the sealing ring with slight radial pretension.

According to another preferred embodiment, the collar portion has a plurality of holes acting as connection channels between the second flow channel and the sealing ring receiving portion. The collar portion particularly has a stop portion which can be moved into abutment with an associated abutment face of the housing cap in a predetermined manner for an axial stop. There is preferably provided in the region of the sealing ring receiving portion between the sealing ring and the collar portion a peripheral free space or a free space which is divided into a plurality of portions and which is in fluid flow contact with the at least one connection channel. According to a preferred development, the free space is provided substantially diametrically in respect of the space to be sealed between the first sealing face of the housing upper portion and the second sealing face of the housing cap at the opposite side of the sealing ring.

According to another preferred construction, the sealing ring has its geometric dimensions adapted to the shapes of the first sealing face of the housing upper portion and the second sealing face of the housing cap in such a manner that the sealing ring can be fitted into the space to be sealed between the first sealing face of the housing upper portion and the second sealing face of the housing cap when the filter housing is in the closure position.

The sealing ring further preferably has, in the region of the peripheral portions thereof, readily deformable sealing lips which are constructed in terms of their geometric dimensions so that, when the filter housing is in the closure position, the sealing lips can be moved into sealing abutment with an associated inner peripheral face of the housing upper portion and with an associated inner peripheral face of the housing cap. It is thereby advantageously ensured that the housing internal pressure is substantially adjusted at the rear side facing the collar portion whilst a pressure, which is between the housing internal pressure and environmental pressure and is substantially lower than the internal pressure in the housing, is adjusted in the space formed by the sealing lips between the sealing ring, the housing upper portion and the housing cap as a result of the leakage paths outwards. Owing to that pressure difference, the seal portion between the sealing lips is advantageously moved into abutment against the associated sealing faces of the housing upper portion and the housing cap and consequently the housing interior is advantageously sealed relative to the environment.

BRIEF DESCRIPTION OF THE DRAWINGS

The invention is explained in greater detail below with reference to embodiments and the appended figures of the drawings, in which:

FIG. 2.1 is a perspective view of an element upper portion of the filter element according to the first preferred embodiment of the present invention;

FIG. 2.2 is a side view of the filter upper portion from FIG. 2.1;

FIG. 2.3 is a top view of the filter upper portion according to FIGS. 2.1 and 2.2;

FIG. 2.4 is a cross-sectional view of part of a compressed air filter according to the first preferred embodiment of the present invention before a closure movement of the filter housing;

FIG. 2.5 is an enlarged illustration of cutout A from FIG. 2.4;

FIG. 2.6 is a cross-sectional view of part of a compressed air filter according to the first preferred embodiment of the present invention after a closure movement of the filter housing;

FIG. 2.7 is an enlarged illustration of cutout B from FIG. 2.6;

FIG. 3.1 is a perspective view of an element upper portion of a filter housing according to a second preferred embodiment of the present invention;

FIG. 3.2 is a side view of the filter upper portion from FIG. 3.1;

FIG. 3.3 is a top view of the filter upper portion according to FIGS. 3.1 and 3.2;

FIG. 3.4 is a cross-sectional view of part of a compressed air filter according to the second preferred embodiment of the present invention before a closure movement of the filter housing or during a closure movement of the filter housing;

FIG. 3.5 is an enlarged illustration of cutout C from FIG. 3.4;

FIG. 3.6 is an enlarged illustration of cutout D from FIG. 3.4;

FIG. 3.7 is a cross-sectional view of part of a compressed air filter according to the second preferred embodiment of the present invention after a closure movement of the filter housing;

FIG. 3.8 is an enlarged illustration of cutout E from FIG. 3.7;

FIG. 4.1 is a perspective view of an element upper portion of a filter element according to a third preferred embodiment of the present invention;

FIG. 4.2 is a side view of the element upper portion from FIG. 4.1;

FIG. 4.3 is a top view of the element upper portion from FIGS. 4.1 and 4.2;

FIG. 4.4 is a cross-sectional view of part of a compressed air filter according to the third preferred embodiment of the present invention before a closure movement of the filter housing;

FIG. 4.5 is an enlarged illustration of cutout F from FIG. 4.4;

FIG. 4.6 is a cross-sectional view of part of a compressed air filter according to the third preferred embodiment of the present invention after a closure movement of the filter housing;

FIG. 4.7 is an enlarged illustration of cutout G from FIG. 4.6;

FIG. 5.1 is a cross-sectional view of part of a compressed air filter according to a fourth preferred embodiment of the present invention;

FIG. 5.2 is an enlarged illustration of cutout H from FIG. 5.1 before the sealing element is subjected to pressure; and FIG. 5.3 is an enlarged illustration of cutout I from FIG. 5.1 after the sealing element is subjected to pressure.

DESCRIPTION OF EXEMPLARY EMBODIMENTS

Figure 1:
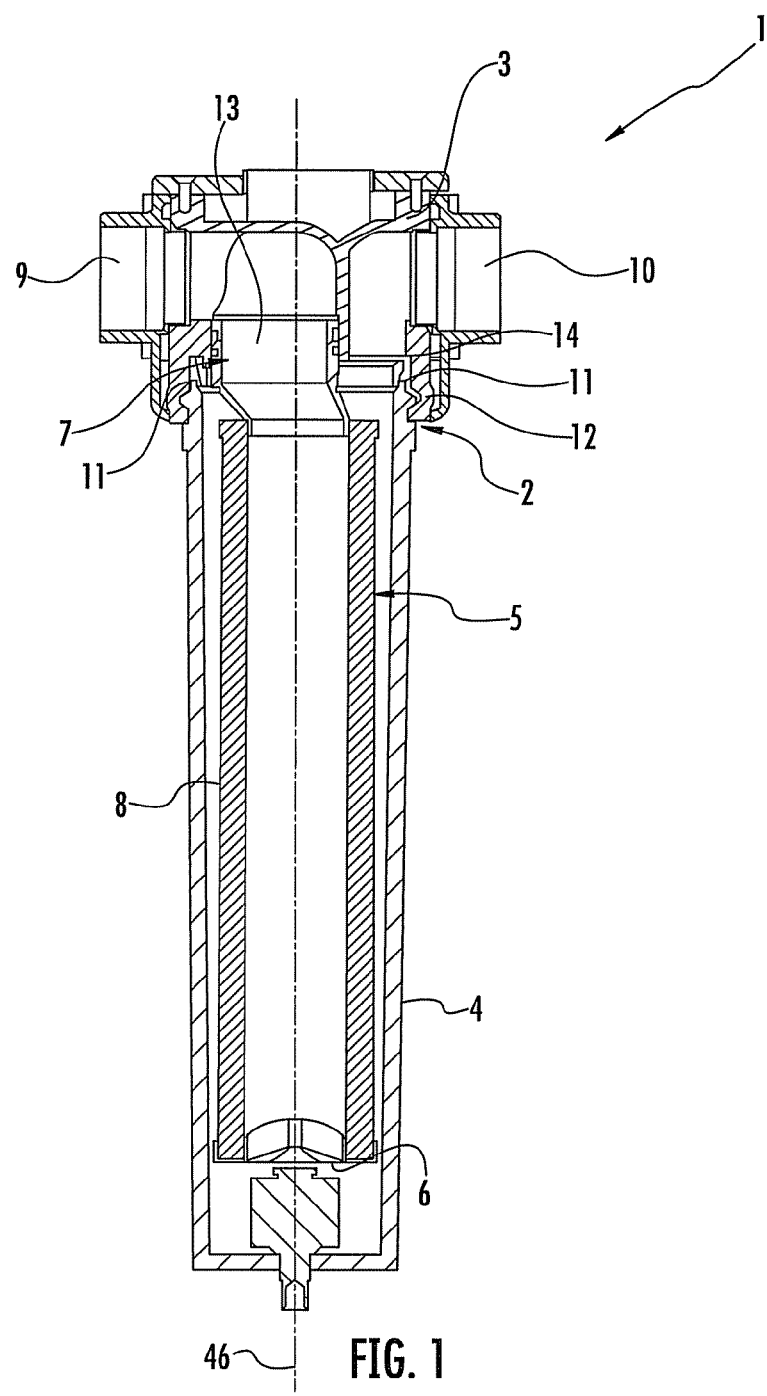
FIG. 1 is a cross-sectional view of a compressed air filter according to a first preferred embodiment of the present invention.

In the figures of the drawings, the same reference numerals indicate identical or functionally identical components unless otherwise indicated.

FIG. 1 is a schematic cross-sectional illustration of a compressed air filter 1 according to a first preferred embodiment of the present invention. As can be seen in FIG. 1, the compressed air filter 1 has a multiple-piece filter housing 2 which comprises a housing upper portion 3 and a housing cap 4 which can be securely connected thereto. The housing upper portion 3 has an intake and discharge channel 9 and a discharge and intake channel 10 and corresponding connections for the compressed air which is intended to be cleaned or has been cleaned.

The compressed air filter 1 further comprises a filter element 5 which can be introduced into the filter housing 2 and which comprises an element lower portion 6, an element upper portion 7 and a filter medium 8 and, according to the present embodiment, is preferably constructed in a rotationally symmetrical manner relative to the centre axis 46 thereof with the exception of a neck portion 13 and ribs 15. According to FIG. 1, for example, the filter medium is wound or pleated in the form of a hollow cylinder and is sealingly connected to the element upper portion 7 and the element lower portion 6 of the filter element 5 securely or releasably, for example, adhesively-bonded in a suitable, sealing manner. Alternatively, the filter medium 8 may also comprise a filling of a granular filter medium, such as, for example, activated carbon in a carrier construction, or a porous hollow body.

According to the present embodiment, the filter element 5 can further be securely connected to the housing cap 4, with such a connection being brought about, for example, by means of a threaded connection 11 according to this embodiment, as can be seen in FIG. 1.

The housing cap 4 can further be sealingly connected securely to the housing upper portion 3 in a closure position by means of a rotary connection 12. In the fitted state or in the closure position, the filter element 5 in the filter housing 2 separates the intake side from the discharge side in such a manner that the compressed air to be filtered has to flow through the filter medium 8. To that end, the element upper portion 7 is sealingly introduced into the filter housing 2 so that the inner space of the hollow-cylindrically arranged filter medium 8 is connected to the intake or discharge side 9 and the outer space of the hollow-cylindrically arranged filter medium 8 is connected to the discharge or intake side 10 of the housing upper portion 3. In the embodiment illustrated in FIG. 1, the compressed air flows in the closure position of the compressed air filter 1 through the intake channel 9 and a neck portion 13 of the element upper portion 7 into the interior of the filter medium 8, through the cylindrical wall of the filter medium 8 for separating foreign bodies from the compressed air stream and via the flow channel which is formed between the outer wall of the filter medium 8 and the inner wall of the housing cap 4 and the flow channel which is formed between the neck portion 13 and an associated collar portion 14 of the element upper portion 7 of the filter element 5 to the discharge channel 10 of the housing upper portion 3. Under some circumstances, it may also be advantageous to provide the flow direction of the compressed air stream so as to be the reverse of the above flow path.

FIGS. 2.1, 2.2 and 2.3 are various views of an element upper portion 7 of the filter element 5 according to a first preferred embodiment of the present invention and FIGS. 2.4 to 2.7 are cross-sectional views of part of a compressed air filter 1 according to the first preferred embodiment of the present invention before and after a closure movement of the filter housing 2.

According to the first embodiment, the element upper portion 7 has a neck portion 13 which has already been mentioned above and which has a cross-sectional shape which differs from the circular shape, for example, a shape similar to a highly rounded triangular shape. The neck portion 13 is further positioned eccentrically relative to the centre axis 46 of the filter element 5. The neck portion 13 forms a portion of the element upper portion 7 projecting forwards in the direction of the associated housing upper portion 3 and is connected to the collar portion 14 which extends around the neck portion 13 by means of a plurality of ribs 15. The ribs 15 extend substantially in a radial and simultaneously axial direction and preferably have a construction which is optimised in technical flow terms in order to reduce the pressure difference. For example, individual ribs 15 are constructed therefor so as to have specific curvature. The ribs 15 allow the compressed air to flow in a longitudinal direction of the filter element 5 between the neck portion 13 and the collar portion 14 of the element upper portion 7. The collar portion 14 is, according to the first embodiment illustrated, constructed so as to be rotationally symmetrical relative to the centre axis 46 of the filter element 5 and so as to extend around the entire periphery of the arranged neck portion 13. The collar portion 14 preferably has an outer diameter which substantially corresponds to the outer diameter of the associated front side of the housing cap 4.

The neck portion 13 and/or the associated receiving contour thereof in the housing upper portion 3 further comprises a seal 44 which is received in an associated groove 45 and which acts as a fluid-tight connection between the neck portion 13 and the corresponding intake or discharge channel 9 in the housing upper portion 3.

The collar portion 14 comprises an abutment face 16 directed towards the outer side in the region facing the neck portion 13. The abutment face 16 serves to receive an associated O-ring 22 and is constructed so as to be substantially rotationally symmetrical relative to the centre axis 46 of the filter element 5 and to extend around it. The diameter of the abutment face 16 tapers in a predetermined manner in the direction towards the element lower portion 6. For example, the abutment face 16 is in the form of a cone face whose centre axis coincides with the centre axis 46 of the filter element 5. The notional tip of the cone is directed in the direction towards the element lower portion 6 and comprises a pitch in the range between 1:2 and 2:1, that is to say, a pitch angle α between the abutment face 16 and the centre axis 46 of the filter element 5 preferably between approximately 25° and 65°. However, the abutment face 16 may also have a pitch which changes constantly or in specific portions.

The abutment face 16 is delimited in the direction of the neck portion 13 by a delimiting rib 17 which is also preferably peripheral and which is rotationally symmetrical relative to the centre axis 46 of the filter element 5. In the direction of the element lower portion 6, the abutment face 16 is delimited by a peripheral channel 18 which is rotationally symmetrical relative to the centre axis 46 of the filter element 5 and which merges in the direction of the element lower portion 6 into a substantially cylindrical guide portion 19 of the collar portion 14, with which the collar portion 14 is received and centred in the housing cap 4.

As can be seen, for example, in FIG. 2.2, the collar portion 14 further has at the cylindrical guide portion 19 an outer thread 20 which can be moved into threaded engagement with an accordingly corresponding inner thread 21 of the housing cap 4. The filter element 5 can be securely screwed into the housing cap 4 by means of that threaded connection 11.

A sealing ring 22 is also provided which is preferably constructed as a conventional O-ring with a substantially circular cross-section of the sealing cord. The sealing ring 22 is drawn on the abutment face 16 preferably with slight radial pretension in a predetermined retention position. The outer diameter of the sealing ring 22 is, in that retention position, on the collar portion 14 or the abutment face 16, smaller than or equal to the diameter of the inner peripheral face 23 of the housing upper portion 3 which forms the first sealing face 23 in the housing upper portion 3 and which the sealing ring 22 sealingly adjoins in the assembled state in the closure position. In addition to the inner peripheral face 23 of the housing upper portion 3 acting as the first sealing face, the end face of the housing cap 4 forms the second sealing face 24 of the filter housing 2, against which the sealing ring 22 is resiliently moved into abutment by a closure movement of the filter housing 2 and consequently in the closure position according to an operating principle which is described below in greater detail.

In order to maintain permanently resilient pretensioning of the sealing ring 22, the abutment face 16 on the collar portion 14 may be constructed so as to be resilient, for example, in the form of individual, radially divided and flexibly resilient segments.

The sealing action of the filter housing 2 is explained below in greater detail with reference to FIGS. 2.4 to 2.7, FIGS. 2.4 and 2.5 illustrating a state before the closure movement of the filter housing 2 and FIGS. 2.6 and 2.7 illustrating a state after the closure movement of the filter housing 2.

In order to receive the neck portion 13 of the element upper portion 7, the housing upper portion 3 has a corresponding receiving contour 25, the neck portion 13 being able to be introduced into the receiving contour 25 in order to provide rotation prevention means for the filter element 5 about the longitudinal axis thereof relative to the housing upper portion 3. It is obvious to a person skilled in the art that a desired rotation prevention means is also possible particularly owing to the cross-section of the neck portion 13 being constructed so as to be different from the circular shape and with a central arrangement thereof at the same time.

According to the present first embodiment, the rotary connection 12 between the housing cap 4 and the housing upper portion 3 is in the form of a bayonet-type connection so that the assembly of the housing cap 4 on the housing upper portion 3 is associated with a rotational movement of the housing cap 4 about the longitudinal axis thereof relative to the housing upper portion 3. However, the rotary connection 12 can also be constructed by means of a suitable threaded connection or the like.

In the first embodiment, a bayonet-type connection without any pitch is preferably used in such a manner that the closure rotation between the housing cap 4 and the housing upper portion 3 is carried out without any relative axial movement between those two components.

In order to introduce the filter element 5 into the filter housing 2, the filter element 5 is first screwed into the housing cap 4 by means of the threaded connection 11 or the inner thread 21 and the outer thread 20 until the sealing ring 22 loosely adjoins the second sealing face 24 or the corresponding end face of the housing cap 4. In that state, the sealing ring 22 is pretensioned only slightly and is not yet expanded along the abutment face 16, as illustrated in FIG. 2.5. In order to indicate to the user an angular position of the filter element 5 necessary for assembly relative to the housing cap 4, suitable optical markings 26 are preferably provided in this instance on the element upper portion 7 and/or on the housing cap 4. Alternatively or additionally, the relative angular position can also be indicated to the user as haptic markings by resilient engaging projections, for example, on the collar portion 14 and by corresponding counter-contours on the housing cap 4.

Owing to the corresponding relative orientation of the inner thread 21 on the inner housing wall of the housing cap 4 and the outer thread 20 on the collar portion 14 of the element upper portion 7, the specially constructed and positioned neck portion 13 and the bayonet-type connection 12 between the housing upper portion 3 and the threaded cap 4, it is ensured that the neck portion 13 of the filter element 5 in a predetermined angular position can be introduced in a rotationally secure manner in an axial direction into the corresponding receiving contour 25 on the housing upper portion 3 and, consequently, the housing cap 4 can be introduced into the housing upper portion 3 with the filter element 5 screwed to the housing cap 4 and moved into engagement with the housing upper portion 3 by means of the bayonet-type connection 12. During a closure movement of the filter housing 2, that is to say, when the housing cap 4 is rotated relative to the housing upper portion 3, the angular position of the filter element 5 relative to the housing upper portion 3 is maintained owing to the above-described rotation prevention means, but with relative rotation thereby being produced between the filter element 5 and the housing cap 4 in such a manner that the filter element 5 is moved further into the housing cap 4. The pitch of the threaded connection 11, that is to say, the pitch of the outer thread 20 and the inner thread 21, determines the magnitude of the relative movement between the filter element 5 and the housing cap 4 at a predetermined angle of rotation of the housing cap 4 relative to the housing upper portion 3.

Consequently, the collar portion 14 of the filter element 5 is screwed further into the housing cap 4 during the closure movement of the filter housing 2; that is to say, further relative movement is produced between the two and directed towards each other, in such a manner that the second sealing face 24 or the front side of the housing cap 4 urges the sealing ring 22 upwards along the abutment face 16 and brings about expansion of the sealing ring 22 over the abutment face 16 which is accordingly constructed in an inclined manner, as illustrated in particular in FIGS. 2.5 and 2.7. The delimiting rib 17 serves to delimit the expansion of the sealing ring 22 and consequently ensures defined and predetermined expansion of the sealing ring 22.

Owing to that radial expansion of the sealing ring 22, the ring 22 is also moved into sealing abutment with the first sealing face 23, that is to say, the inner peripheral face of the housing upper portion 3, as illustrated in FIG. 2.7, during the closure movement of the filter housing 2 in addition to the abutment with the second sealing face 24. Consequently, the sealing ring 22 abuts the first sealing face 23 only at the end of the closure movement of the filter housing 2, which is advantageous for reasons of friction technology.

It should be noted at this point that radial expansion of the sealing ring 22 can also be brought about in an equivalent manner in that, instead of the sealing ring 22 being guided along the abutment face 16, the sealing ring 22 is radially expanded by the sealing ring 22 being correspondingly squeezed only by means of a compression operation owing to corresponding abutment with a correspondingly constructed abutment face 16 and being subjected to radial expansion owing to that squeezing action. In this instance, for example, the abutment face 16 may be in the form of a right-angled, L-shaped abutment face or the like. In this instance, it is possible to have any type of abutment face 16 which ensures, when a force acts axially on the sealing ring 22, compression of the sealing ring 22 in such a manner that it is subjected to radial expansion.

Ultimately, the abutment against the two sealing faces 23 and 24 with a build-up of pressure in the filter housing 2 is increased owing to the pressure force of the internal pressure on the sealing ring 22 so that the desired complete and reliable sealing of the filter housing 2 is ensured.

According to the first embodiment, the filter element 5 is axially supported on the housing cap 4 by means of the threaded connection 11 in such a manner that, although the sealing ring 22 is resiliently pretensioned in the assembly state in which the filter element 5 is introduced into the housing cap 4, it is not located in the axial main force path between the housing upper portion 3 and the housing cap 4. The service-life of the sealing ring 22 is thereby advantageously increased.

The disassembly of the compressed air filter 1 for changing a filter element 5 which may be contaminated is carried out similarly to the above-described assembly sequence but in the reverse order.

It is obvious to a person skilled in the art that the geometric dimensions and shapes of the individual components and faces, in particular the sealing faces, the sealing ring, the abutment face and the delimiting rib, can be modified as long as the sealing ring is radially expanded during the closure movement of the filter housing along the abutment face for sealing abutment with the sealing faces. It should be noted at this point that, in the present application, the term "tapering abutment face" is intended to be understood to be any type of abutment face 16 which defines the receiving space for receiving the sealing ring 22 in such a manner that a force acting axially on the sealing ring 22 brings about radial expansion of the sealing ring. Consequently, for example, an L-shaped abutment face or an abutment face with an acute angle between two portions of the abutment face is also intended to be understood and is to be considered to be equivalent to the abutment face 16 illustrated in the figures in accordance with the present application.

A compressed air filter 1 and a filter element 5 according to a second preferred embodiment of the present invention are explained in greater detail below with reference to FIGS. 3.1 to 3.8, respectively. The second embodiment of the present invention has, in contrast to the first embodiment, a modified threaded connection 11 between the filter element 5 and the housing cap 4 which is evaluated in greater detail below.

According to the second preferred embodiment, the cylindrical guide portion 19 of the collar portion 14 does not have an outer thread but instead a plurality of resiliently deformable resilient tongues 27. The flexible resilient tongues 27 are arranged along the peripheral face of the guide portion 19 preferably with regular spacing from each other and, as can be seen particularly in FIG. 3.2, at a different axial level so that a predetermined threaded engagement with an associated inner thread 21 of the housing cap 4 is ensured.

The resilient tongues 27 are, for example, in the form of flaps which are punched out of the guide portion 19 and the free end of which is orientated axially in the direction of the neck portion 13. The resilient tongues 27 extend radially with the free ends thereof before the filter element 5 is introduced into the housing cap 4 preferably substantially as far as the centre of the sealing cord cross-section, as illustrated in FIG. 3.5, and at a maximum substantially as far as the outer diameter of the sealing ring 22. The resilient tongues 27 thereby form a bearing device for carrying the sealing ring 22 before the filter element 5 is introduced into the housing cap 4 at a predetermined position. However, it is also conceivable for the resilient tongues 27 each to have webs which extend in a substantially radial direction and which serve to support the sealing ring 22. In that case, the resilient tongues 27 can also extend radially beyond the radial extent of the sealing ring 22. For example, the webs are formed on the free end of the resilient tongues 27 and are constructed in such a manner that they can be displaced into the punched-out openings if the resilient tongues are deformed accordingly.

The resilient tongues 27 are further pretensioned in the direction towards the outer side and can be resiliently adjusted in the direction of the centre axis 46 of the filter element 5 owing to the resilient property thereof, as illustrated in FIG. 3.6.

The housing cap 4 preferably has a thread having a sawtooth-like profile as the inner thread 21 corresponding to the resilient tongues 27 at the inner peripheral face thereof, as illustrated in FIGS. 3.5 and 3.6. In this instance, the individual thread portions of the inner thread 21 may have different thread depths. For example, the thread depth may extend axially in the direction of the second sealing face 24 of the housing cap 4. A second sealing face 24 which is as wide as possible is thereby provided for a predetermined wall thickness of the housing cap 4 so that optimised abutment against the associated sealing ring 22 is ensured. Owing to the thread depth extending accordingly, it is further possible for the filter element 5 to be able to be advantageously unscrewed from the housing cap 4 with the smallest possible number of rotations.

According to the second preferred embodiment, the filter element 5 can be introduced axially into the housing cap 4 when the sealing ring 22 is retained in a predetermined retention position at the free ends of the resilient tongues 27. In this instance, the resilient tongues 27 move into snap-fit engagement with the saw-tooth-like inner thread 21 of the housing cap 4 from a predetermined insertion depth owing to the resilient construction thereof. The filter element 4 can be screwed in further in order to introduce the filter element 5 further into the housing cap 4 because the resilient tongues 27 and the saw-tooth-like profile of the inner thread 21 constitute a type of threaded engagement and allow thread rotation. Disassembly of the filter element 5 is carried out similarly by unscrewing the filter element 5 and consequently the resilient tongues 27 from the inner thread 21 of the housing cap 4 in the opposite direction.

Similarly to the first preferred embodiment, introducing or screwing the filter element 5 into the housing cap 4 according to the second embodiment also produces further insertion of the filter element 5 into the housing cap 4 in such a manner that the second sealing face 24 radially expands the sealing ring 22 along the abutment face 16, as illustrated in FIG. 3.6, and urges it into sealing abutment with the first sealing face of the housing upper portion 3 (not illustrated).

With regard to features and operations of the present invention which have not been explained in greater detail in conjunction with the above description of the second preferred embodiment, reference may be made to the previous description of the first embodiment because those features and operations are of similar form so that it is possible to dispense with a detailed explanation thereof in order to avoid unnecessary repetition.

A compressed air filter 1 and a filter element 5 according to a third preferred embodiment of the present invention is explained in greater detail below with reference to FIGS. 4.1 to 4.7, respectively.

According to the third preferred embodiment, in comparison with the two embodiments mentioned above, a relative movement between the collar portion 14 of the filter element 5 and the housing cap 4 is brought about in a different manner during the closure movement of the filter housing 2. According to the third embodiment, the rotary connection 12 between the housing upper portion 3 and the housing cap 4 is constructed as a bayonet-type connection having a predetermined pitch so that the housing upper portion 3 and the housing cap 4 carry out relative axial movement in a direction towards each other during closure movement of the filter housing 2.

A stop device 28 is also provided which produces an axial stop between the collar portion 14 of the element upper portion 7 and the housing upper portion 3 in order to axially move the element upper portion 7 and consequently the abutment face 16 of the collar portion 14 relative to the housing cap 4 during a closure movement of the filter housing 2. The stop device 28 preferably comprises a stop face of the front end portion of the collar portion 14 facing the housing upper portion 3 and a correspondingly associated stop portion of the housing upper portion 3 facing the collar portion 14, as illustrated, for example, in FIGS. 4.5 and 4.7. Accordingly, the stop device 28 brings about a stop between the stop face of the collar portion 14 of the filter element 5 and the correspondingly associated stop portion of the housing upper portion 3, during the closure movement of the filter housing 2 and the associated relative axial movement between the housing upper portion 3 and the housing cap 4, in such a manner that relative axial movement in a direction towards each other is brought about between the filter element 5 and the housing cap 4. That relative movement again urges the sealing ring 22 along the abutment face 16 and radially expands the sealing ring 22 accordingly into sealing abutment with the associated first sealing face 23 in a resiliently pretensioned state, similarly to the embodiments already explained above.

Unlike the two embodiments first mentioned, however, according to the third preferred embodiment a connection between the filter element 5 and the housing cap 4 is not produced by means of a corresponding threaded connection but instead by means of a suitably constructed engaging connection 29 which is explained in greater detail below.

As can be seen in particular in FIGS. 4.1 and 4.2, the element upper portion 7 has, for example, two engagement devices in the form of catches 30 which are preferably in the form of projections of the collar portion 14 in the direction of the element lower portion 6 and constructed so as to be peripherally offset by approximately 180°, which projections are resilient in a radial direction. For example, the catches 30 each form a projection in the direction of the element lower portion 6 of an associated rib 15. The catches 30 further preferably have a substantially rectangular construction with rounded lateral edges. Each catch 30 further has a substantially central opening or receiving region 31 for receiving a correspondingly associated counter-engagement device 35.

For a simpler engagement operation, each catch 30 further comprises chamfered outer lateral edges 32 and at least one chamfered outer lower edge 33. Chamfered portions which accordingly support a lateral disengagement operation of the correspondingly associated counter-engagement device 35 are further provided at least at the lateral edges 34 of the opening 31.

The housing cap 4 preferably accordingly has, as the counter-engagement device 35, corresponding engaging projections 35 which are arranged at the inner peripheral face and which slide over the chamfered edges of the catches 30 or the opening 31 of the catches 30 during corresponding engagement and disengagement movements and can consequently be engaged in a corresponding engaging connection with the catches 30 or disengaged from the engaging connection. The engaging projections 35 are constructed in a complementary manner for positionally stable engagement with the associated openings 31 of the catches 30 so that the filter element 5 is engaged with the housing cap 4 in a positionally stable manner in the engaged state.

The outer lateral edges 32 of the catches 30 preferably have relatively flat chamfers in relation to relatively steep chamfers of the lateral edges 34 of the opening 31. Consequently, the application of force for locking engagement between the catch 30 and the associated engaging projection 35 is smaller for the user than the application of force for the corresponding disengagement operation. It is thereby advantageously possible to ensure for the user a haptic preferred angular position of the filter element 5 relative to the housing cap 4. That preferred angular position is preferably selected in such a manner that the neck portion 13 of the filter element 5 having the correspondingly associated receiving contour 25 can be introduced therein so as to prevent rotation in the housing upper portion 3 and the bayonet-type connection 12 between the housing cap 4 and the housing upper portion 3 can be moved axially into engagement, that is to say, the positioning of the catches 30 and the correspondingly associated engaging projections 35 is preferably selected so that, during an engagement state, the bayonet-type connection between the housing cap 4 and the housing upper portion 3 is in the open position for separating those components from each other. Consequently, the filter element 5 is advantageously retained axially in the housing cap 4 when the housing cap 4 is separated from the housing upper portion 3 by the engaging connection brought about between catches 30 and associated engaging projections 35.

In order to introduce a new filter element 5, the element 5 is first introduced axially into the housing cap 4, either already in the corresponding engagement position or in a disengagement position, the engagement position being brought about in that instance by subsequent manual rotation of the filter element 5. The engagement operation may in this case act as a haptic indication of a preferred angular position for the user. However, it is also possible to envisage suitable additional or alternative markings 26 for this purpose.

The housing cap 4 with the filter element 5 engaged is subsequently introduced into the housing upper portion 3 accordingly and securely connected thereto in a sealing manner owing to closure movement by means of the bayonet-type connection 12. For the introduction operation, it is again possible to provide predetermined markings in order to indicate a preferred angular position to the user. As already explained in detail above, relative movement between the filter element 5 and the housing cap 4 is thereby produced by the axial stop device 28, whereby the sealing ring 22 is expanded radially along the abutment face 16 and in sealing abutment with the first sealing face 23.

The operation is carried out in the reverse order in order to remove a filter element 5 which is, for example, contaminated, the filter element 5 still being engagingly connected to the housing cap 4 after the housing cap 4 has been removed from the housing upper portion 3 by the bayonet-type connection 12 being loosened. By manually rotating the filter element 5 in the housing cap 4, the engaging connection can be moved out of engagement and the filter element 5 can readily be removed from the housing cap 4.

The catches 30 are further preferably constructed in such a manner that they take up a radially non-deformed state both in the engagement position on the correspondingly associated engaging projections 35 and in the disengagement position remote from the engaging projections 35. Since the element upper portions 7 are generally produced as injection-moulded components from a suitable plastics material which may exhibit occurrences of creep in some circumstances under permanently extreme deformations or pretensions, that radially non-deformed state of the catches 30 ensures a longer service-life thereof and consequently of the engaging connection between the filter element 5 and the housing cap 4. However, it is obvious to a person skilled in the art that a kinematic reversal of the above-explained engaging connection is also conceivable with suitable modifications, according to which the engaging projections or similar counter-engagement devices are provided accordingly, for example, on the filter element 5 and the associated catches 30 or complementary engagement devices which are constructed differently in a corresponding manner are provided accordingly on the inner peripheral face of the housing cap 4.

It should be noted at this point that the catches may also have a plurality of openings each having correspondingly chamfered edges, for example, two identical openings arranged beside each other per catch. The catches may further each have an open lateral region so that a sliding ramp is provided only at a predetermined side and the associated counter-engagement device is introduced or withdrawn at the opposite side without any sliding ramp in the receiving region of the respective catch. This is intended to be adapted and provided in accordance with the construction of the other components and the direction of rotation during the closure movement. If the catches or a corresponding engagement or counter-engagement device is/are provided, it is further possible to dispense with additional devices for indicating the angular position because the above-described engaging connection can take over that function.

With regard to features and operations of the present invention which have not been explained in greater detail with regard to the above description of the third preferred embodiment, reference may be made to the above descriptions of the first and second embodiments because those features and operations are of similar form so that a detailed explanation thereof may be dispensed with to avoid unnecessary repetition. It should further be noted at this point that the individual special solutions of the first three embodiments mentioned may be freely combined with each other within the scope of the general inventive notion of the present invention as long as it appears to be technically advantageous to a person skilled in the art.

A compressed air filter 1 and a filter element 5 according to a fourth preferred embodiment of the present invention are explained below in greater detail with reference to FIGS. 5.1 to 5.3. With regard to general explanations, reference may be made to the embodiments described above to avoid repetition.

According to the fourth preferred embodiment, the collar portion 14 of the element upper portion 7 has a peripheral construction, for example, which is rotationally symmetrical relative to the centre axis 46 of the filter element 5 and which has S-like geometry which is angled twice, as can be seen in particular in FIGS. 5.2 and 5.3.

The collar portion 14 comprises a first fixing portion which faces the neck portion 13 and which is in the form of a receiving channel 36 and a second fixing portion facing the element lower portion 6, also in the form of a receiving channel 37. Between the first receiving channel 36 and the second receiving channel 37, the collar portion 14 has a sealing ring receiving portion 38, the contour of which is adapted to the geometric dimensions of the associated sealing faces of the housing cap 4 and the housing upper portion 3 in the closure position of the filter housing.

The collar portion 14 further has a plurality of holes 39 which open out of the sealing ring receiving portion 38 and which connect a free space 40, which is positioned in front of the sealing ring receiving portion 38 and which has the internal pressure of the filter housing 2, in particular to the flow region between the outer wall of the filter medium 8 of the filter element 5 and the inner wall of the housing cap 4. The free space 40 may be in the form of either a peripheral free space or a free space divided into a plurality of portions.

The collar portion 14 further comprises a stop portion 47 which is provided, for example, below the second receiving channel 37 as a peripheral projection directed towards the outer side. The stop portion 47 corresponds to an associated abutment face 48 inside the housing cap 4, for example, in the form of a peripheral step in such a manner that an axial stop is ensured at a predetermined axial closure position when the filter element 5 is introduced into the housing cap 4, as can be seen in FIGS. 5.2 and 5.3.

The collar portion 14 further comprises a specially shaped seal 41 which is adapted in terms of the geometric dimensions thereof to the construction of the abutment face 16 of the collar portion 14 and which can be securely introduced in the fixing portions 36, 37 with the axial lateral edges thereof. The specially shaped seal 41 delimits in the introduced state the free space 40 between the sealing ring receiving portion 38 of the abutment face 16 and the inner face of the specially shaped seal 41, as illustrated in FIGS. 5.2 and 5.3. The free space 40 is preferably positioned in the space to be sealed between the first sealing face 23 of the housing upper portion 3 and the second sealing face 24 of the housing cap 4 at the diametrically opposed side of the specially shaped seal 41 when the filter housing 2 is in the closure position.

Furthermore, the specially shaped seal 41 has small and readily deformable sealing lips 42, 43, preferably each one in a peripheral region, which are in sealing contact with the first sealing face 23 or the associated inner peripheral face of the housing upper portion 3 and an associated inner peripheral face of the housing cap 4 after the filter element 5 has been assembled in the filter housing 2. The sealing lips 42, 43 may be constructed in such a manner that they do not bring about complete sealing at the associated faces but instead simply cause the cross-sections of the leakage paths which extend outwards from the housing interior between the housing upper portion 3 and the housing cap 4 to be large in relation to the remaining leakage paths between the sealing lips 42, 43 and the associated abutment faces. It is thereby possible for the housing pressure to be substantially adjusted at the side of the specially shaped seal 41 facing the collar portion 14 in the free space 40 when the compressed air filter 1 is subjected to pressure, whilst a pressure which is between the housing internal pressure and environmental pressure and which is substantially lower than the internal pressure in the filter housing 2 is adjusted in the space which is formed by the sealing lips 42, 43 between the specially shaped seal 41, the housing upper portion 3 and the housing cap 4 owing to the leakage paths outwards. Owing to that pressure difference, the portion of the specially shaped seal 41 between the sealing lips 42, 43 is moved into sealing abutment with the first and second sealing faces 23, 24 of the housing upper portion 3 or the housing cap 4, whereby the housing interior is sealed with respect to the environment as desired.

It is obvious to a person skilled in the art that the cross-section profile of the specially shaped seal 41 may be freely selected within a broad range. However, it is necessary to have at least a portion of the specially shaped seal 41 which can be fitted into the free space 40 between the front-side sealing face of the housing cap 4 or the second sealing face 24 and the inner peripheral face of the housing upper portion 3 or the first sealing face 23. Furthermore, the holes 39 provided can also ensure that the free space 40 is connected to the inner region of the filter medium 8 in order to provide the desired pressure difference.

Although the present invention has been described above with reference to preferred embodiments, it is not limited thereto but instead may be modified in various ways. In particular, the above-described embodiments may be combined with each other at least partially.

LIST OF REFERENCE NUMERALS

1 Compressed air filter
2 Filter housing
3 Housing upper portion
4 Housing cap
5 Filter element
6 Element lower portion
7 Element upper portion
8 Filter medium
9 Intake channel
10 Discharge channel
11 Threaded connection
12 Rotary connection
13 Neck portion
14 Collar portion
15 Ribs
16 Abutment face
17 Delimiting rib
18 Channel
19 Guide portion
20 Outer thread
21 Inner thread
22 Sealing ring
23 First sealing face
24 Second sealing face
25 Receiving contour
26 Markings
27 Resilient tongues
28 Stop device
29 Engaging connection
30 Catch
31 Opening/receiving region
32 Lateral edges of a catch
33 Lower edge of a catch
34 Lateral edges of a catch opening
35 Engaging projections
36 First fixing portion
37 Second fixing portion
38 Sealing ring receiving portion
39 Holes
40 Free space
41 Specially shaped seal
42 Sealing lip
43 Sealing lip
44 Seal
45 Groove
46 Centre axis of the filter element
47 Stop portion
48 Abutment face
$\alpha$ Pitch angle

The invention claimed is:

1. A filter element which is for separating foreign bodies from a compressed air stream and which has:
   an element lower portion;
   an element upper portion which has a neck portion which forms a first flow channel and a collar portion which is constructed so as to extend at least partially around the neck portion and which is connected to the neck portion so as to form a second flow channel; and
   a filter medium which is sealingly connected to the element lower portion and the element upper portion in order to form a gas flow path between the first flow channel and the second flow channel through the filter medium;
      the collar portion having an abutment face, which is provided at least partially at the outer periphery and which tapers in the direction of the element lower portion, in order to receive an associated sealing element in such a manner that a force which acts substantially axially on the sealing element from the direction of the element lower portion brings about radial expansion of the sealing element along the abutment face.

2. The filter element according to claim 1, wherein the collar portion is constructed so as to extend around the entire periphery of the neck portion and in a substantially rotationally symmetrical manner relative to the centre axis of the filter element.

3. The filter element according to claim 1, wherein the abutment face of the collar portion is constructed so as to extend around the entire periphery and is constructed in a substantially rotationally symmetrical manner relative to the centre axis of the filter element.

4. The filter element according to claim 1, wherein the abutment face of the collar portion is in the form of a cone face whose pitch angle between the abutment face and the centre axis of the filter element is preferably between 25° and 65°.

5. The filter element according to claim 1, wherein the collar portion has a delimiting rib which delimits the abutment face in the direction of the element upper portion and which is preferably constructed in a peripheral manner and so as to be substantially rotationally symmetrical relative to the centre axis of the filter element.

6. The filter element according to claim 1, wherein the sealing element is in the form of a sealing ring and can be drawn on the collar portion in a predetermined retention position with slight radial pretension.

7. The filter element according to claim 6, wherein the sealing ring has in the predetermined retention position an outer diameter which at most is slightly greater than the outer diameter of the delimiting rib of the collar portion delimiting the abutment face.

8. The filter element according to claim 1, wherein the sealing element is in the form of an O-ring seal with a substantially circular cross-section.

9. The filter element according to claim 1, wherein the abutment face of the collar portion is constructed so as to be resiliently deformable in order to maintain permanent, resilient pretensioning of the sealing element.

10. The filter element according to claim 9, wherein the abutment face of the collar portion has a plurality of radially arranged and resiliently deformable segments.

11. The filter element according to claim 1, wherein the collar portion is securely connected to the neck portion by means of a plurality of ribs, the plurality of ribs preferably being constructed in an optimised manner in technical flow terms.

12. The filter element according to claim 1, wherein the neck portion is constructed so as to have a cross-section which is different from the circular shape and/or has an eccentric position relative to the centre axis of the filter element.

13. The filter element according to claim 1, wherein the element upper portion has at least one optical, acoustic and/or haptic angular position indication device.

14. The filter element according to claim 1, wherein the collar portion has at least one engagement device as a haptic angular position indication device.

15. The filter element according to claim 1, wherein the element upper portion has a cylindrical guide portion which faces the element lower portion and which has an outer thread.

16. The filter element according to claim 1, wherein the element upper portion has a cylindrical guide portion which faces the element lower portion and which has a plurality of resiliently deformable resilient tongues whose free ends are arranged in an axial direction so as to face the neck portion and at a different axial level, and whose radial extent substantially corresponds to the radial extent of the sealing ring in the retention position for support thereof.

17. The filter element according to claim 1, wherein the collar portion has an axial stop portion.

18. The filter element according to claim 1, wherein the collar portion has at least one engagement device for engaging connection with an associated counter-engagement device of a filter housing.

19. The filter element according to claim 18, wherein the at least one engagement device has a plurality of catches which are in the form of projections of the collar portion in the direction of the element lower portion and which each have at least one receiving region for an engaging receiving member of the associated counter-engagement device, which projections are resilient in a radial direction.

20. The filter element according to claim 19, wherein at least some lateral outer edges of each catch facing the element lower portion are constructed so as to be correspondingly chamfered in order to provide a relatively flat sliding ramp.

21. The filter element according to claim 19, wherein at least some lateral edges of the at least one receiving region of a catch are constructed so as to be chamfered accordingly in order to provide a relatively steep sliding ramp.

22. The filter element according to claim 19, wherein the catches are each constructed in such a manner that they take up a radially non-deformed state during the engaging connection with the associated counter-engagement device and during the rest position, in which the catches are each out of engagement with the associated counter-engagement device.

23. A compressed air filter which is for separating foreign bodies from a compressed air stream and which has:
a filter element which is constructed according to at least one of the preceding claims; and a filter housing which receives the filter element in a sealing manner and which has a housing upper portion having a first sealing face, which is associated with the sealing element of the filter element and which is provided at least partially at an inner periphery, and a housing cap having a second sealing face which is associated with the sealing element of the filter element and which is provided at least partially at a front side;
the housing cap being able to be connected to the housing upper portion by means of a closure movement of the filter housing in order to form a sealing closure position; and
the filter element being able to be connected to the housing upper portion and the housing cap in such a manner that the closure movement of the filter housing brings about a relative movement which is directed substantially axially towards each other between the collar portion of the filter element and the housing cap, whereby the second sealing face of the housing cap radially expands the sealing element owing to a sealing advance movement along the abutment face of the collar portion of the filter element into sealing abutment with the first sealing face of the housing upper portion.

24. The compressed air filter according to claim 23, wherein the housing upper portion has a receiving contour which is adapted to the shape of the neck portion of the filter element in order to form rotation prevention means for the filter element relative to the housing upper portion of the filter housing.

25. The compressed air filter according to claim 23, wherein the sealing element is in the form of a sealing ring and has in the retention position thereof an outer diameter which is smaller than or equal to the diameter of the first sealing face of the housing upper portion.

26. The compressed air filter according to claim 23, wherein the housing cap, the housing upper portion and/or the element upper portion of the filter element has/have at least one optical, acoustic and/or haptic angular position indication device in order to indicate relative positions in relation to each other.

27. The compressed air filter according to claim 23, wherein the housing cap can be connected to the housing upper portion by means of a thread-type and/or bayonet-type connection, preferably by means of a bayonet-type connection without any pitch, or a similar rotary connection.

28. The compressed air filter according to claim 23, wherein the element upper portion comprises a cylindrical guide portion which faces the element lower portion and which has an outer thread.

29. The compressed air filter according to claim 28, wherein the housing cap has an inner thread which corresponds to the outer thread of the element upper portion for a threaded engagement.

30. The compressed air filter according to claim 23, wherein the element upper portion has a cylindrical guide portion which faces the element lower portion and which has a plurality of resiliently deformable resilient tongues whose free ends are arranged in an axial direction so as to face the neck portion and at a different axial level, and whose radial extents and constructions allow the sealing element to be supported in a predetermined retention position.

31. The compressed air filter according to claim 30, wherein the housing cap has an inner thread which corresponds to the resiliently deformable resilient tongues of the element upper portion.

32. The compressed air filter according to claim 31, wherein the inner thread of the housing cap has a saw-tooth-like profile.

33. The compressed air filter according to claim 31, wherein the inner thread of the housing cap extends axially in the direction of the second sealing face of the housing cap.

34. The compressed air filter according to claim 23, wherein the housing cap can be connected to the housing upper portion by means of a bayonet-type connection with predetermined pitch.

35. The compressed air filter according to claim 23, wherein the collar portion has an axial stop device for an axial stop against an associated stop face of the housing upper portion, preferably the front side of the collar portion facing the housing upper portion.

36. The compressed air filter according to claim 23, wherein the collar portion has at least one engagement device for engaging connection with an associated counter-engagement device of the housing cap.

37. The compressed air filter according to claim 36, wherein the at least one engagement device has a plurality of catches which are in the form of projections of the collar portion in the direction of the element lower portion and which each have at least one receiving region for an engaging receiving member of the associated counter-engagement device of the housing cap, which projections are resilient in a radial direction.

38. The compressed air filter according to claim 37, wherein at least some lateral outer edges of each catch facing the element lower portion are constructed so as to be chamfered accordingly in order to provide a relatively flat sliding ramp.

39. The compressed air filter according to claim 37, wherein at least some lateral edges of the at least one receiving region of a catch are constructed so as to be chamfered accordingly in order to provide a relatively steep sliding ramp.

40. The compressed air filter according to claim 37, wherein the catches are each constructed in such a manner that they take up a radially non-deformed state during the engaging connection with the associated counter-engagement device and during the rest position, in which the catches are each out of engagement with the associated counter-engagement device.

41. The compressed air filter according to claim 35, wherein the filter element can be connected to the housing upper portion and the housing cap in such a manner that the closure movement of the filter housing moves the axial stop device of the collar portion of the filter element into axial abutment with the associated stop face of the housing upper portion for a relative movement which is directed substantially axially towards each other between the filter element and the housing cap.

42. The compressed air filter according to claim 23, wherein there is provided between the collar portion of the filter element and the housing cap a corresponding stop for an axial support of the filter element against movement in the direction of the housing cap, preferably in the form of a corresponding shoulder on the filter element and/or the housing cap.

43. The compressed air filter according to claim 36, wherein the inner wall of the housing cap has at least one counter-engagement device for engaging connection with the at least one engagement device of the collar portion of the filter element.

44. The compressed air filter according to claim 43, wherein the at least one counter-engagement device comprises a plurality of engaging projections which are provided on the inner wall of the housing cap in such a manner that they can be moved into locking engagement with the associated catches when the bayonet-type connection is in the open position.

45. The compressed air filter according to claim 37, wherein the catches of the filter element each have lateral outer edges which are chamfered in a relatively flat manner and lateral edges of the opening chamfered steeply in relation thereto in order to form a haptic preferred angular position, in which the counter-engagement devices are in engagement with the associated catches.

46. The compressed air filter according to claim 45, wherein in the preferred angular position, the neck portion of the filter element can be moved axially into engagement with the receiving contour in the housing upper portion and the bayonet-type connection can be moved axially into engagement between the housing cap and the housing upper portion.

47. A filter element which is for separating foreign bodies from a compressed air stream and which has:
an element lower portion;
an element upper portion which has a neck portion which forms a first flow channel and a collar portion which is constructed so as to extend at least partially around the neck portion and which is connected to the neck portion so as to form a second flow channel; and
a filter medium which is sealingly connected to the element lower portion and the element upper portion in order to form a gas flow path between the first flow channel and the second flow channel through the filter medium;
the collar portion having a sealing element receiving portion, which is provided at least partially at the outer periphery, at least one connection channel between one of the two flow channels and the sealing element receiving portion and sealing element fixing portions, which axially delimit the sealing element receiving portion, for securely and sealingly receiving peripheral portions of an associated sealing element in such a manner that an excess pressure which is supplied by the at least one connection channel and which acts on the sealing element brings about expansion of the sealing element in the direction towards the outer side in the region of the sealing element receiving portion.

48. The filter element according to claim 47, wherein the sealing element is in the form of a peripheral, annular, specially shaped seal.

49. The Filter element according to claim 47, wherein the sealing element has readily deformable sealing lips in the region of the peripheral portions thereof.

50. The filter element according to claim 47, wherein the collar portion has two sealing element fixing portions which are preferably each in the form of a receiving channel which extends around the collar portion in order to securely receive the peripheral portions of the sealing element with slight radial pretension of the sealing element.

51. The filter element according to claim 47, wherein the collar portion has a plurality of holes acting as connection channels between the second flow channel and the sealing element receiving portion.

52. The filter element according to claim 47, wherein the collar portion has a stop portion.

53. The filter element according to claim 47, wherein there is provided in the region of the sealing element receiving portion between the sealing element and the collar portion a peripheral free space or a free space which is divided into a plurality of portions and which is in fluid flow contact with the at least one connection channel.

54. A compressed air filter which is for separating foreign bodies from a compressed air stream and which has:
a filter element which is constructed according to claim 47; and a filter housing which sealingly receives the filter element and which has a housing upper portion having a first sealing face, which is associated with the sealing element of the filter element and which is provided at least partially at an inner periphery, and a housing cap having a second sealing face which is associated with the sealing element of the filter element and which is provided at least partially at a front side;

the housing cap being able to be connected to the housing upper portion by means of a closure movement of the filter housing in order to form a sealing closure position; and the filter element being able to be connected to the housing upper portion and the housing cap in such a manner that the sealing element expands in the closure position of the filter housing when an excess pressure occurs through the at least one connection channel in the region of the sealing element receiving portion into sealing abutment with the first sealing face of the housing upper portion and into sealing abutment with the second sealing face of the housing cap.

55. The compressed air filter according to claim 54, wherein the sealing element is in the form of a peripheral annular specially shaped seal.

56. The compressed air filter according to claim 54, wherein the sealing element has readily deformable sealing lips in the region of the peripheral portions thereof.

57. The compressed air filter according to claim 54, wherein the collar portion of the filter element has two sealing element fixing portions which in each case are preferably in the form of a receiving channel which extends around the collar portion in order to securely receive the peripheral portions of the sealing element with slight radial pretension of the sealing element.

58. The compressed air filter according to claim 54, wherein the collar portion of the filter element has a plurality of holes acting as connection channels between the second flow channel and the sealing element receiving portion.

59. The compressed air filter according to claim 54, wherein the collar portion of the filter element has a stop portion which can be moved into abutment with an associated abutment face of the housing cap in a predetermined manner for an axial stop.

60. The compressed air filter according to claim 54, wherein there is provided in the region of the sealing element receiving portion between the sealing element and the collar portion a peripheral free space or a free space which is divided into a plurality of portions and which is in fluid flow contact with the at least one connection channel.

61. The compressed air filter according to claim 60, wherein the free space is provided substantially diametrically in respect of the space to be sealed between the first sealing face of the housing upper portion and the second sealing face of the housing cap at the opposite side of the sealing element.

62. The compressed air filter according to claim 54, wherein the sealing element has its geometric dimensions adapted to the shapes of the first sealing face of the housing upper portion and the second sealing face of the housing cap in such a manner that the sealing element can be fitted into the space to be sealed between the first sealing face and the second sealing face when the filter housing is in the closure position.

63. The compressed air filter according to claim 56, wherein the sealing lips of the sealing element are constructed so as to have such geometric dimensions that, when the filter housing is in the closure position, one sealing lip can be moved into sealing abutment with the first sealing face or an associated inner peripheral face of the housing upper portion and the other sealing lip can be moved into sealing abutment with an associated inner peripheral face of the housing cap.

64. The compressed air filter according to claim 63, wherein the sealing element can be subjected to excess pressure in such a manner that the sealing element can be pressed against the first sealing face and the second sealing face can be pressed into reinforced sealing abutment.

65. A compressed air filter which is for separating foreign bodies from a compressed air stream and which has:
  a filter element which is for separating foreign bodies from a compressed air stream and which has:
    an element lower portion;
    an element upper portion which has a neck portion which forms a first flow channel and a collar portion which is constructed so as to extend at least partially around the neck portion and which is connected to the neck portion so as to form a second flow channel; and
    a filter medium which is sealingly connected to the element lower portion and the element upper portion in order to form a gas flow path between the first flow channel and the second flow channel through the filter medium;
    the collar portion having an abutment face, which is provided at least partially at the outer periphery in order to receive an associated sealing element in such a manner that the sealing element has a predetermined radial extent without additional action of force and, when a force acts substantially axially on the sealing element from the direction of the element lower portion, is subjected to predetermined radial expansion owing to the abutment of the sealing element on the abutment face;
  a filter housing which receives the filter element in a sealing manner and which has a housing upper portion having a first sealing face, which is associated with the sealing element of the filter element and which is provided at least partially at an inner periphery, and a housing cap having a second sealing face which is associated with the sealing element of the filter element and which is provided at least partially at a front side;
  the housing cap being able to be connected to the housing upper portion by means of a closure movement of the filter housing in order to form a sealing closure position; and
  the filter element being able to be connected to the housing upper portion and the housing cap in such a manner that the closure movement of the filter housing brings about a relative movement which is directed substantially axially towards each other between the collar portion of the filter element and the housing cap, whereby the second sealing face of the housing cap radially expands the sealing element owing to the substantially axial action of force owing to the second sealing face and the abutment of the sealing element against the abutment face of the collar portion of the filter element into sealing abutment with the first sealing face of the housing upper portion.

* * * * *